(12) United States Patent
Shikii et al.

(10) Patent No.: US 8,294,979 B2
(45) Date of Patent: Oct. 23, 2012

(54) WAVELENGTH CONVERSION DEVICE AND IMAGE DISPLAY APPARATUS USING THE SAME

(75) Inventors: Shinichi Shikii, Nara (JP); Kiminori Mizuuchi, Ehime (JP); Tetsuro Mizushima, Hyogo (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 402 days.

(21) Appl. No.: 12/743,646

(22) PCT Filed: Nov. 19, 2008

(86) PCT No.: PCT/JP2008/003380
§ 371 (c)(1),
(2), (4) Date: May 19, 2010

(87) PCT Pub. No.: WO2009/066450
PCT Pub. Date: May 28, 2009

(65) Prior Publication Data
US 2010/0245719 A1    Sep. 30, 2010

(30) Foreign Application Priority Data
Nov. 21, 2007 (JP) ................................. 2007-301488

(51) Int. Cl.
*G02F 2/02* (2006.01)
*H01S 3/10* (2006.01)

(52) U.S. Cl. ........... 359/326; 359/328; 372/22; 372/108
(58) Field of Classification Search ........... 359/326–328
See application file for complete search history.

(56) References Cited

U.S. PATENT DOCUMENTS
5,321,718 A * 6/1994 Waarts et al. ................ 372/108
5,978,392 A 11/1999 Adachi
(Continued)

FOREIGN PATENT DOCUMENTS
EP       0 814 546       12/1997
(Continued)

OTHER PUBLICATIONS

International Search Report issued Jan. 6, 2009 in International (PCT) Application No. PCT/JP2008/003380.
(Continued)

*Primary Examiner* — Hemang Sanghavi
(74) *Attorney, Agent, or Firm* — Wenderoth, Lind & Ponack, L.L.P.

(57) ABSTRACT

A wavelength conversion device includes a laser light source that emits a fundamental wave; a wavelength conversion element that converts the fundamental wave into a second harmonic wave; and an optical system including a wavelength selective mirror that reflects the fundamental wave transmitted through the wavelength conversion element without being converted into the second harmonic wave, while transmitting therethrough the second harmonic wave generated by wavelength conversion, wherein the optical system makes the fundamental wave transmitted through the wavelength conversion element without being converted into the second harmonic wave enter the wavelength conversion element again to be subjected to wavelength conversion once or more than once, while being focused by the wavelength selective mirror, and the conversion efficiency in at least one of the second stage and stages subsequent to the second stage is higher than the conversion efficiency in the first stage, where the conversion efficiency in each stage is defined as: (a second harmonic wave generated in one stage)/(a square of the fundamental wave entered in the one stage).

12 Claims, 11 Drawing Sheets

U.S. PATENT DOCUMENTS

| | | |
|---|---|---|
| 7,068,690 B2 | 6/2006 | Okazaki et al. |
| 7,612,934 B2 * | 11/2009 | Bragg et al. ............ 359/328 |
| 8,068,274 B2 * | 11/2011 | Mizushima et al. ........ 359/326 |
| 2002/0150362 A1 * | 10/2002 | Gutin et al. ............ 385/122 |
| 2004/0008744 A1 | 1/2004 | Okazaki et al. |
| 2007/0053388 A1 | 3/2007 | Mizuuchi |
| 2007/0165184 A1 | 7/2007 | Kasazumi et al. |

FOREIGN PATENT DOCUMENTS

| | | |
|---|---|---|
| EP | 1 703 318 | 9/2006 |
| JP | 60-57825 | 4/1985 |
| JP | 2-185081 | 7/1990 |
| JP | 2003-121895 | 4/2003 |
| JP | 2004-96088 | 3/2004 |
| JP | 2004-219911 | 8/2004 |
| JP | 2006-19603 | 1/2006 |
| JP | 2006-208629 | 8/2006 |
| JP | 2007-58191 | 3/2007 |
| JP | 2007-225786 | 9/2007 |

OTHER PUBLICATIONS

Supplementary European Search Report issued Nov. 3, 2010 in Application No. EP 08 85 2516.

* cited by examiner

WAVELENGTH CONVERSION DEVICE AND IMAGE DISPLAY APPARATUS USING THE SAME

TECHNICAL FIELD

The present invention relates to a wavelength conversion device capable of efficiently performing wavelength conversion from a fundamental wave into a second harmonic wave, and an image display apparatus using the same.

BACKGROUND ART

A highly monochromatic high-power 10-W-class visible light source is advantageous for realizing a large-size image display apparatus, a high-brightness display apparatus and the like. To meet the demand for such image display apparatuses, laser diodes have been adopted to realize high-power light sources for red and blue light sources among the three primary colors of red, green and blue. However, for the green light source, a high-power semiconductor laser light source has not yet been in practical use, and instead a wavelength conversion element, that converts a fundamental wave emitted from a solid state laser medium into a second harmonic wave, has been adopted to realize a high-output green laser light.

For such high-output green laser light source, a wavelength conversion device capable of converting the wavelength of the fundamental wave with high efficiency is particularly demanded. To meet this, various proposals have been made. For example, the structure, which realizes improved conversion efficiency, by lengthening an optical waveguide using a return optical waveguide provided in the wavelength conversion element (see, for example, Patent Document 1). Also for the structure adopting a solid laser with laser diode excitation, the structure wherein an optical path is lengthened by causing multiple reflections of a laser beam of the solid laser inside the wavelength conversion element has been proposed to realize the wavelength conversion with high efficiency (see, for example, Patent Document 2).

Another structure has been proposed wherein the fundamental wave that has entered the wavelength conversion element and has transmitted without being converted into a second harmonic wave are caused to be reflected from a reflector, and the fundamental wave reflected from the reflector are caused to enter the wavelength conversion element again in different optical path. This structure realizes a high output power by repeating the foregoing process (see, for example, Patent Document 3). With this structure, a high-output inexpensive wavelength conversion element which can convert the wavelength with high efficiency can be realized with a simple structure.

Another proposal has been made to add a feature of collecting the incident light by a light collecting optical system to be focused onto an intermediate point of an optical path formed between both ends of a wavelength conversion element and controlling the light collecting conditions to reduce the volume of the incident signal light beam to the minimum (see, for example, Patent Document 4). Furthermore, an optical system having two wavelength conversion elements optically connected in series with a lens provided in-between has also been proposed. With this structure, it is possible to realize a high-output laser light source which enables still improved wavelength conversion efficiency with simpler structure.

Incidentally, in the wavelength conversion element, generally it can be said that the smaller is the beam diameter of the fundamental wave, the higher is the wavelength conversion efficiency. However, according to the foregoing conventional structure, the fundamental wave is collected only once in the wavelength conversion element. Therefore, although modifications have been made to increase the wavelength conversion efficiency with the state collected once, it is still difficult to obtain overall high conversion efficiency. Moreover, when the intensity of light of the fundamental wave is high and the intensity of light of the second harmonic wave as generated is also high, a significant amount of heat is generated by absorbing light inside the wavelength conversion element. Therefore, a mismatch occurs with the phase matching temperature in one stage and other stages subsequent to that stage, and quality of light in that stage deteriorates. The resultant problem is that the wavelength conversion efficiency is lowered in one stage and stages subsequent to that stage, thereby making it difficult to realize overall high output power of the second harmonic wave and an overall improvement in the wavelength conversion efficiency.

Patent Document 1: Japanese Patent Application Laid-open No. S60-57825
Patent Document 2: Japanese Patent Application Laid-open No. H2-185081
Patent Document 3: Japanese Patent Application Laid-open No. 2006-208629
Patent Document 4: Japanese Patent Application Laid-open No. 2007-58191

DISCLOSURE OF THE INVENTION

It is an object of the present invention to provide a wavelength conversion device capable of suppressing decrease in wavelength conversion efficiency due to heat generated in a wavelength conversion element and performing wavelength conversion from a fundamental wave into a harmonic wave with high efficiency.

In order to achieve the foregoing object, a wavelength conversion device according to one aspect of the present invention includes a laser light source that emits a fundamental wave; a wavelength conversion element that converts the fundamental wave into a second harmonic wave; and an optical system including a wavelength selective mirror that reflects the fundamental wave transmitted through the wavelength conversion element without being converted into the second harmonic wave, while transmitting therethrough the second harmonic wave generated by wavelength conversion, wherein the optical system makes the fundamental wave transmitted through the wavelength conversion element without being converted into the second harmonic wave enter the wavelength conversion element again to be subjected to wavelength conversion once or more than once, while being focused by the wavelength selective mirror, and the conversion efficiency in at least one of the second stage and stages subsequent to the second stage is higher than the conversion efficiency in the first stage, where the conversion efficiency in each stage is defined as: (a second harmonic wave generated in one stage)/(a square of the fundamental wave entered in said one stage).

According to the foregoing structure, the optical system is arranged such that the wavelength conversion efficiency in the first stage is set lower than the wavelength conversion efficiency in at least one of the second stage and stages subsequent the second stage. With this structure, in the first stage, the wavelength conversion efficiency is held low. Therefore, although the intensity of the fundamental wave is high and a significant amount of heat is generated by absorbing light in the wavelength conversion element in the first stage, it is possible to prevent a reduction in wavelength conversion efficiency even in the case where a high-power fundamental wave is entered in the first stage of the wavelength conversion element. Moreover, the fundamental wave is reflected from the optical system a plurality of times to cause them enter the wavelength conversion element again a plurality of times. With this structure, it is possible to reduce an overall size of the wavelength conversion device. As a result, it is possible to provide a compact size wavelength conversion device, which is capable of performing wavelength conversion with improved efficiency.

Other objects, characteristics and superior matters of the present invention will be sufficiently understood from the following detailed description. Moreover, advantages of the present invention will be clarified by the following description with reference to the appended drawings.

BEST MODE FOR CARRYING OUT THE INVENTION

First Embodiment

One embodiment of the present invention will be described herein below with reference to the drawings.

Figure 1:
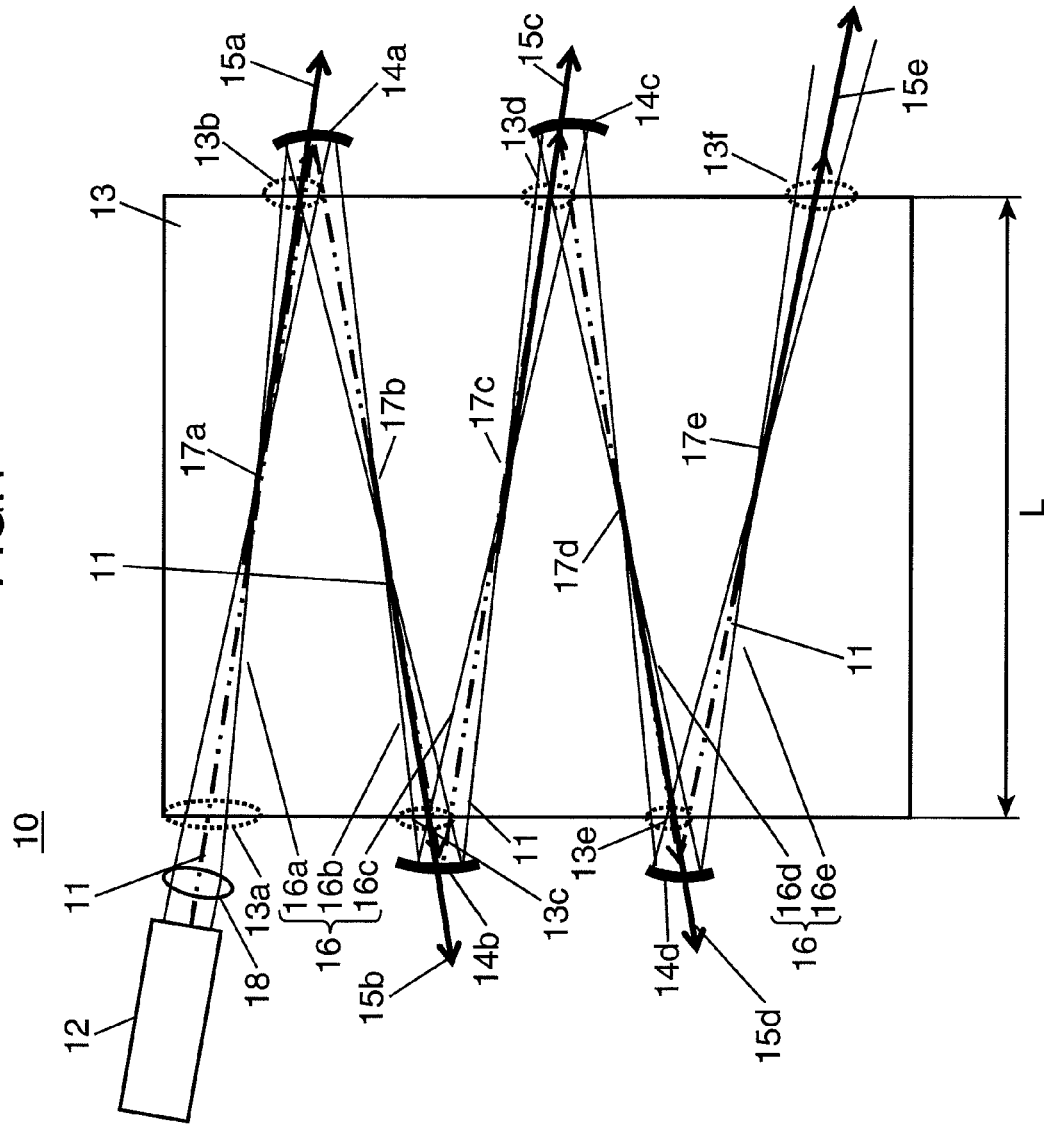
FIG. 1 shows a schematic structure of one example of a wavelength conversion device according to one embodiment of the present invention.
Figure 2:
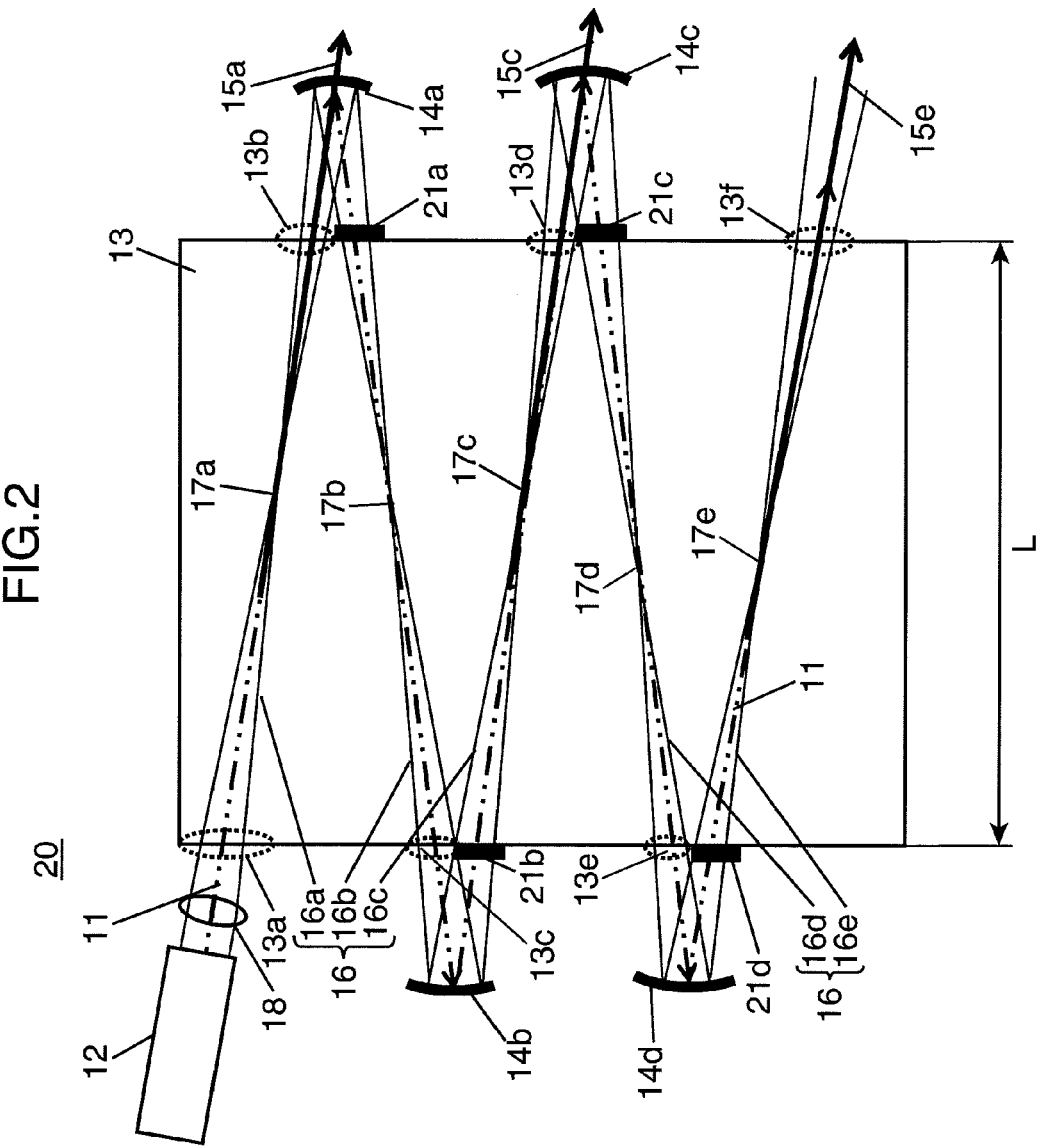
FIG. 2 shows a schematic structure of another example of the wavelength conversion device according to one embodiment of the present invention.

FIG. 1 shows a schematic structure of a wavelength conversion device 10 according to one example of the present embodiment. FIG. 2 shows a schematic structure of a wavelength conversion device 20 according to another example of the present embodiment. As shown in FIG. 1, the wavelength conversion device 10 includes a laser light source 12 that emits a fundamental wave 11, a light collecting lens 18 that collects the fundamental wave 11 emitted from the laser light source 12 to be focused onto a predetermined position to a predetermined beam waist diameter, a wavelength conversion element 13 that converts the fundamental wave 11 into a second harmonic wave 15 (15a through 15d), and a wavelength selective mirror 14 (14a, 14b, 14c, 14d) that reflects the fundamental wave 11 transmitted through the wavelength conversion element 13 and collects the fundamental wave 11 to be focused onto a predetermined position to a predetermined beam diameter, while transmitting therethrough the second harmonic wave 15.

A principle of wavelength conversion from a fundamental wave into a harmonic wave in the wavelength conversion device 10 according to the present embodiment will be described herein.

A fundamental wave 11 emitted from the laser light source 12 enters the wavelength conversion element 13 through an inlet port 13a, and is collected to be focused onto a predetermined position to a predetermined beam waist diameter 17a. The fundamental wave 11 as collected to a predetermined beam waist diameter 17a propagates through the wavelength conversion element 13 while partially being converted into a second harmonic wave 15a. Then, the fundamental wave 11 and the second harmonic wave 15a are output from the wavelength conversion element 13 through an outlet port 13b, to be reached to the wavelength selective mirror 14a. Herein, a path that extends from the inlet port 13a to the outlet port 13b is referred to as a first path 16a.

The wavelength selective mirror 14a allows the second harmonic wave 15a to transmit therethrough and reflects therefrom the fundamental wave 11. The fundamental wave 11 reflected from the wavelength selective mirror 14a enters the wavelength conversion element 13 again and propagates through the wavelength conversion element 13 while being collected to a beam waist diameter 17b (a second path 16b). As in the first path 16a, the fundamental wave 11 propagates through the wavelength conversion element 13 while partially being converted into a second harmonic wave 15b (the second path 16b). Then, the fundamental wave 11 and the second harmonic wave 15b are output from the wavelength conversion element 13 through an outlet port 13c, to be reached to the wavelength selective mirror 14b.

Like the above wavelength selective mirror 14a, the wavelength selective mirror 14b allows the second harmonic wave 15b to transmit therethrough and reflects therefrom the fundamental wave 11. The fundamental wave 11 reflected from the wavelength selective mirror 14b enters the wavelength conversion element 13 again, and propagates through the wavelength conversion element 13 while being collected to a beam waist diameter 17c (a third path 16c).

The foregoing process is repeated in each of the subsequent folded paths. That is, the fundamental wave 11 which has not being converted into a second harmonic wave 15c in the third path 16c is output from the wavelength conversion element 13 through an outlet port 13d to be reached to the wavelength selective mirror 14c. Then, the fundamental wave 11 is reflected from the wavelength selective mirror 14c, enters the wavelength conversion element 13 again, and propagates through the wavelength conversion element 13 while being collected to a beam waist diameter 17d (a fourth path 16d).

Similarly, the fundamental wave 11 which has not been converted into a second harmonic wave 15d in the fourth path 16d is output from the wavelength conversion element 13 through an outlet port 13e to be reached to the wavelength selective mirror 14d. Then, the fundamental wave 11 is reflected from the wavelength selective mirror 14d, enters the wavelength conversion element 13 again, and propagates through the wavelength conversion element 13 while being collected to a beam waist diameter 17e (a fifth path 16e).

As described above, a fundamental wave 11 is converted into a second harmonic wave while propagating through the wavelength conversion element 13 in a zigzag pattern, and the second harmonic wave is output from the wavelength conversion element 13 by means of each of the wavelength selective mirrors 14a through 14d. Incidentally, the temperature of the wavelength conversion element 13 is adjusted to a temperature suitable for wavelength conversion by means of a Peltier element (not shown).

It has been established that when a second harmonic wave is obtained by introducing the fundamental wave once into the wavelength conversion element, the second harmonic wave $P_{2w}$ with the following maximum intensity of light can be obtained under the optimum light collecting condition of:

$$P_{2w}=(1.068\times 2\omega^3 \times d_{eff}^2 \times P_w^2 \times L)/(\pi \times \in o \times c^4 \times n_w^2) \qquad (1)$$

In Equation (1), ω represents an angular frequency of a fundamental wave, $d_{eff}$ represents an effective nonlinear optical constant, $P_w$ represents a power of the fundamental wave, L represents an element length, $\in o$ represents a dielectric constant in a vacuum, $n_w$ represents a refraction index with respect to the fundamental wave, and c represents a speed of light.

In this case, where the intensity of light of the fundamental wave is high and the intensity of the second harmonic wave as generated is too high, heat generated by absorbing light in the wavelength conversion element becomes significant. This results in a problem that the conversion efficiency from the fundamental wave to the second harmonic wave decreases. In this case, with the wavelength conversion in only one stage, the conversion efficiency satisfying Equation (1) cannot be obtained whichever beam diameter or beam position is selected. Further, where the wavelength conversion element generates heat, the phase matching temperature in the first stage shifts from the phase matching temperatures in stages subsequent the first stage even when a fundamental wave is introduced a plurality of times into the wavelength conversion element. In this case, the quality of second harmonic wave generated by wavelength conversion in the first stage decreases. In addition, in the second stage and stages subsequent the second stage, the wavelength conversion efficiency decreases, and an overall increase in the total output of second harmonic waves and an overall increase in the wavelength conversion efficiency are impeded.

In view of the foregoing problem associated with the system wherein the fundamental wave is entered into the wavelength conversion element a plurality of times, to suppress the generation of heat, it is considered effective to reduce the conversion efficiency in the first stage to suppress the light intensity of the second harmonic wave as generated. Here, the conversion efficiency in each stage is defined as: (a second harmonic wave generated in one stage)/(a square of the fundamental wave entered in said one stage). Here, the power density of the incident fundamental wave can be reduced by increasing the beam waist diameter, which makes it possible to reduce the wavelength conversion efficiency with ease. Therefore, in the system wherein the fundamental wave enters a plurality of times, it may be arranged so as to increase the beam waist diameter 17a in the first stage within the range where the problem of heat generated in the wavelength conversion element 13 does not occur. In this case, although the intensity of light of the second harmonic wave obtained in the first stage decreases, it is possible to prevent heat generated by absorbing light in the wavelength conversion element 13 and the deterioration in beam quantity caused by the heat as generated. As a result, wavelength conversion can be performed with high efficiency also in the subsequent stages, and the total intensity of light of second harmonic waves can be increased.

Wavelength conversion performed in the second path will be explained below. The fundamental wave that enters the second path is the fundamental wave that remained without being converted into the second harmonic wave in the first path. Therefore, the intensity of light of the fundamental wave is obviously decreased from that of the fundamental wave entered the first path. Therefore, where the beam is collected to the same beam waist diameter 17b in the second stage as that in the first stage, the same conversion efficiency as that of the first stage can be obtained without having an outstanding problem of heat generated by absorbing light. However, the light intensity of the second harmonic wave 15b as generated in the second stage becomes lower than that in the first stage.

In response, it is possible to increase the total light intensity of the second harmonic wave as generated up to the second path by increasing the wavelength conversion efficiency in the second path than the first path within the range where the problem of heat generated in the wavelength conversion element 13 does not occur. Namely, it may be arranged such that the beam waist diameter 17b in the second path is set smaller than the beam waist diameter 17a in the first path within the range where the problem of heat generated in the wavelength conversion element 13 does not occur. The foregoing can be said for not only the second path but also for the third path and the path subsequent to the third path. Namely, in each of the third path and the paths subsequent to the third path, it is possible to improve an overall wavelength conversion efficiency from the fundamental wave to the second harmonic wave by increasing the wavelength conversion efficiency within the range where the problem of heat generated in the wavelength conversion element does not occur.

Incidentally, it is not necessary that the wavelength conversion efficiency into the second harmonic wave in a latter stage be always set higher than that in a former stage. As long as the wavelength conversion efficiency in a path of the very first stage is set lower than the wavelength conversion efficiency in a path of at least one of the second stage and stages subsequent to the second stages, it is still possible to suppress the problem caused by a decrease in wavelength conversion efficiency due to heat generated in the wavelength conversion element 13.

According to the foregoing structure, it is possible to increase the wavelength conversion efficiency from the fundamental wave into the second harmonic wave. Therefore, the required number of stages for obtaining the desired light intensity of the second harmonic wave can be reduced, which in turn makes it possible to reduce the width of the wavelength conversion element. As a result, a compact size wavelength conversion device can be realized. Furthermore, where a smaller number of stages is required for obtaining the desired light intensity of the second harmonic wave, it is also possible to reduce a loss which occurs each time the light transmits through the wavelength conversion element 13. As a result, the wavelength conversion efficiency can be improved.

It is preferable that each of the wavelength selective mirror 14a to 14d shown in FIG. 1 be provided with a wavelength selective film which reflects therefrom the fundamental wave 11 and transmits therethrough both the second harmonic wave and third harmonic wave of the second harmonic waves 15a to 15d. According to the structure adopting the wavelength selective mirror with the foregoing wavelength selective film, it is also possible to prevent the heat generated in the wavelength conversion element by absorbing the third harmonic wave. As a result, the wavelength conversion efficiency can be still improved.

For the laser light source 12 of the present embodiment, a fiber laser doped with rare earth of Yb as a laser active substance may be adopted, which outputs the fundamental wave 11 with a central wavelength of 1064 nm using, for example, a laser diode for excitation. In such fiber laser, the laser diode for fiber excitation can excite the fiber laser, for example, with a laser beam of a maximum light output of 10 W and a wavelength of 915 nm. In this case, where the fundamental wave 11 with a central wavelength of 1064 nm is input as an incident light from the fiber laser into the wavelength conversion element 13, a green second harmonic wave with a wavelength of 532 nm is generated.

For example, the wavelength conversion element 13 may be formed to have a length L of 26 mm and a width W (not shown in the figure) of 8 mm in the direction perpendicular to the length L. As shown in FIG. 1, when adopting the wavelength conversion element 13 of this size, it is possible to ensure the effective length of longer than 130 mm for the optical path 16 in the wavelength conversion element 13. As a result, it is possible to lengthen the optical path of the wavelength conversion within the compact size wavelength conversion element 13.

For the material of the wavelength element 13 of the present embodiment, for example, $MgO:LiNbO_3$, or such material formed therein a polarization inversion structure may be adopted. Alternatively, the wavelength conversion element 13 may be made of potassium titanyl phosphate ($KTiOPO_4$:KTP), $Mg:LiTaO_3$ or the like, or such material formed therein a polarization inversion structure.

FIG. 2 shows schematic structures of a wavelength conversion device 20 as another example of the present embodiment. The wavelength conversion device 20 differs from the wavelength conversion device 10 in that a λ/2 wavelength plate (21a through 21d) is provided in each optical path for the light which outputs through an outlet port (13b to 13e) and enters again in the wavelength conversion element 13. Other than the above, the wavelength conversion device 20 has a common basic structure with the wavelength conversion device 10. Accordingly, members that are common with the wavelength conversion device 10 are assigned with the same reference numerals and the explanation thereof is appropriately omitted.

According to the wavelength conversion device 20 provided with the λ/2 wavelength plate, as shown in FIG. 2, a polarization direction of the fundamental wave 11 emitted from the laser light source 12 is perpendicular to a plane of FIG. 2, and a crystal axis direction of the wavelength conversion element 13 is also perpendicular to the plane of FIG. 2. In this case, the fundamental wave 11 subjected to the wavelength conversion in the first path 16a is output through the outlet port 13b, and is reflected from the wavelength selective mirror 14a. The reflected light is then incident onto the λ/2 wavelength plate 21a. As a result, the polarization direction of the light is polarized by 90° to be parallel to the plane of FIG. 2.

In this state of polarization, the fundamental wave 11 is not subjected to the wavelength conversion in the wavelength conversion element 13, and therefore a second harmonic wave is not generated in the second path 16b. Further, the fundamental wave 11, which is output through the outlet port 13c, is reflected from the wavelength selective mirror 14b, and then enters the wavelength conversion element 13 again through the λ/2 wavelength plate 21b. As a result, the polarization direction of the fundamental wave 11 is changed by 90° in a direction perpendicular to the plane of FIG. 2 again. In this state, the fundamental wave 11, which propagates through the third path 16c, is subjected to the wavelength conversion, so that a second harmonic wave 15c is generated. By repeating the foregoing process, the wavelength conversion is performed in the paths 16a, 16c and 16e, which extend from the left to the right in the plate of FIG. 2. On the other hand, the wavelength conversion is not performed in the paths 16b and 16d which extend from the right to the left in the plan of FIG. 2. Namely, with the foregoing structure, a second harmonic wave is output from the wavelength conversion element 13 from only the right side of the wavelength conversion element 13 in FIG. 2. That is, the second harmonic wave is output from the wavelength conversion element 13 only in one direction rather than from two directions. Therefore, for example, in the case where a fundamental wave is collected to be focused onto a single point, it is possible to collect the fundamental wave by means of a simpler optical system as compared with the case where a second harmonic wave is generated from two sides of the wavelength conversion element. The foregoing structure is therefore advantageous in that it can be suitably adapted for various applications with ease. Herein, it is needless to mention that the second harmonic wave can be output from only the left side of the wavelength conversion element 13 by making beforehand the polarization direction of the fundamental wave 11 that enters the wavelength conversion element 13 through the inlet port 13a be tilted by 90°.

According to the foregoing structure, the fundamental wave 11 is transmitted through the λ/2 wavelength plate once in each path. Alternatively, the structure provided with the λ/4 wavelength plates on both ends of the wavelength conversion element 13 may be adopted. In this case, the polarization direction of the fundamental wave 11 is changed by 90° by making the fundamental wave 11 be transmitted through the λ/4 wavelength plates before and after being reflected from the relevant wavelength selective mirrors. As described above, in the case where λ/4 wavelength plates are provided in a wide area, positioning accuracy for the wavelength conversion element 13 can be alleviated. Accordingly, it is possible to provide a wavelength conversion device which can be assembled with ease.

Figure 3A:
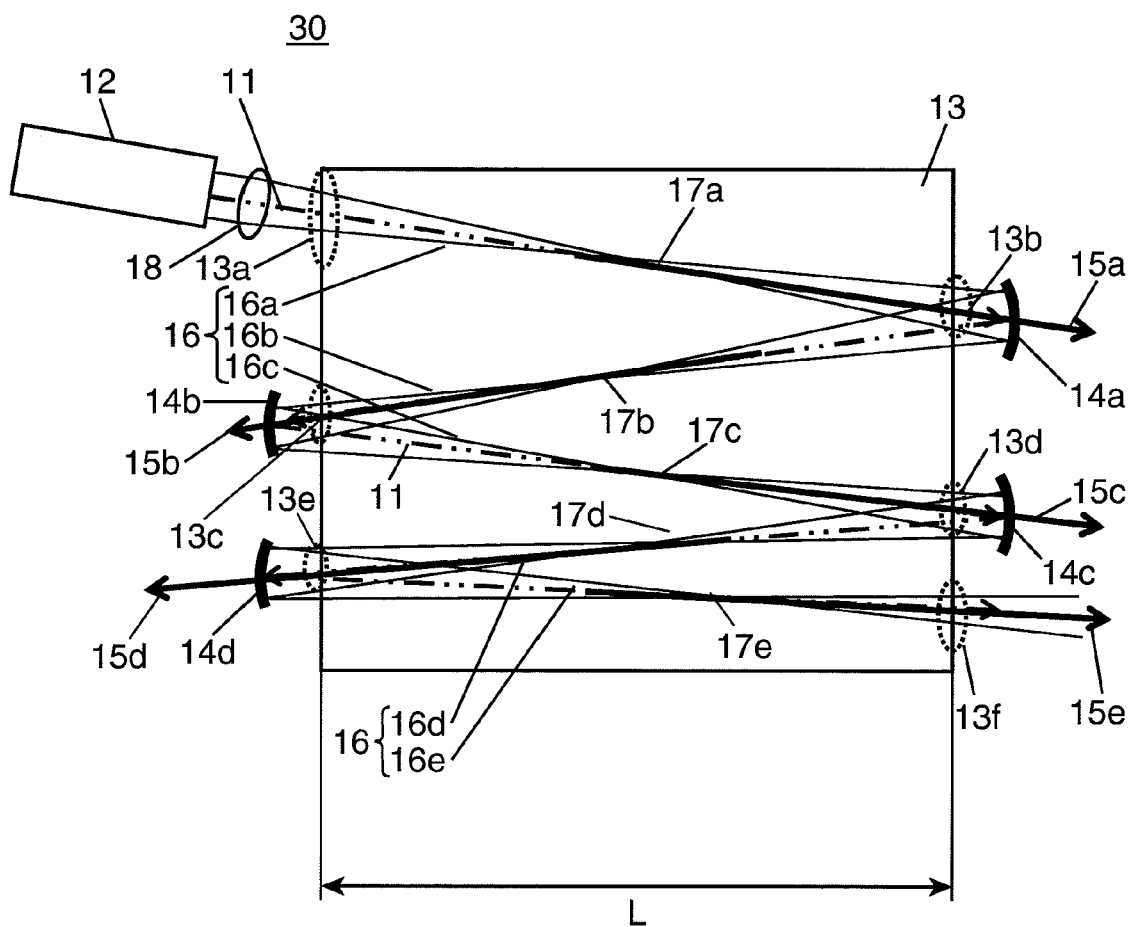
FIG. 3A shows a schematic structure of another example of the wavelength conversion device according to one embodiment of the present invention.
Figure 3B:
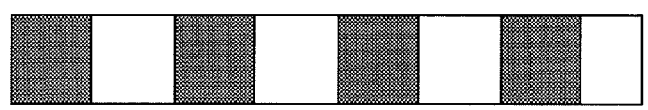
FIG. 3B shows a schematic structure of a wavelength conversion element of the wavelength conversion device shown in FIG. 3A.

FIG. 3A and FIG. 3B each show a schematic structure of another wavelength conversion device 30 according to the present embodiment. More specifically, FIG. 3A is a plan view of the wavelength conversion device 30. FIG. 3B is a side view of the wavelength conversion element, which schematically shows the polarization inversion structure of the wavelength conversion element 13.

The wavelength conversion device 30 differs from the wavelength conversion device 10 in that an incident angle of the fundamental wave 11 that enters the wavelength conversion element 13 is set gradually closer to the direction perpendicular to an incident plane in a latter stage. As shown in FIG. 3B, the wavelength conversion element 13 has the polarization inversion structure formed in a direction which is parallel to the incident plane. Other than that, the wavelength conversion device 30 of the present embodiment has common basic structure with the wavelength conversion device 10. Accordingly, members that are common with the wavelength conversion device 10 are assigned with the same reference numerals and the explanation thereof is appropriately omitted.

Typically, in the case where the incident direction of the fundamental wave is not perpendicular to the polarization inversion structure, interference between second harmonic waves generated at respective positions becomes weak because of a walk-off angle, which results in a reduction in wavelength conversion efficiency. The wavelength conversion device 10 shown in FIG. 1 is arranged so as to adjust the wavelength conversion efficiency by adjusting a beam waist diameter. On the other hand, the wavelength conversion device 30, in accordance with the present embodiment, adjusts the wavelength conversion efficiency by setting an incident angle of the fundamental wave to be gradually closer to the direction perpendicular to a latter stage.

Specifically, in the first path, the incident angle of the fundamental wave that enters the wavelength conversion element 13 is tilted from the direction perpendicular to the incident plate, so that the wavelength conversion efficiency into the second harmonic wave is decreased in the first path to prevent generation of heat in the wavelength conversion element 13. In the second path, the incident angle of the fundamental wave is set closer to the direction perpendicular to the incident plane than that in the first path, to realize higher wavelength conversion efficiency into the second harmonic wave than that in the first path.

The foregoing arrangement, wherein the wavelength conversion efficiency in a latter stage is set higher than that in a former stage by setting the incident angle of the fundamental wave in a path of a latter stage is set closer to the direction perpendicular to the incident plane than the incident angle of the fundamental wave in a path of a former stage, is not limited to the relationship between the first path and the second path.

Namely, also for the third path and paths subsequent to the third path, it is preferable that the incident angle in a latter path be set closer to the direction perpendicular to the incident plane than that in a former path to realize higher wavelength conversion efficiency within the range where the problem of heat generated in the wavelength conversion element 13 does not occur.

As a result, it is possible to improve overall wavelength conversion efficiency from a fundamental wave into a second harmonic wave in the wavelength conversion element 13.

Incidentally, it is not necessary that the wavelength conversion efficiency into the second harmonic wave in a latter stage be always set higher than that in a former stage. As long as the wavelength conversion efficiency in a path of the very first stage is set lower than the wavelength conversion efficiency in a path of at least one of the second stage and stages subsequent to the second stages, it is still possible to suppress the problem caused by a decrease in wavelength conversion efficiency due to heat generated in the wavelength conversion element 13. As a result, the number of stages necessary to obtain the second harmonic wave with the desired intensity of light can be reduced and therefore the width of the wavelength conversion element 13 can be reduced. As a result, the wavelength conversion device 30 can be reduced in size, and the manufacturing costs can be reduced.

It is needless to mention that the wavelength conversion element 13 of the present embodiment is applicable to those of bulk-type shown in the figures, and the wavelength conversion element 13 of the present embodiment is also applicable to those of slab-type waveguide.

Second Embodiment

Another embodiment of the present invention will be described herein below with reference to FIG. 1, FIG. 4 and FIG. 5.

Figure 4:
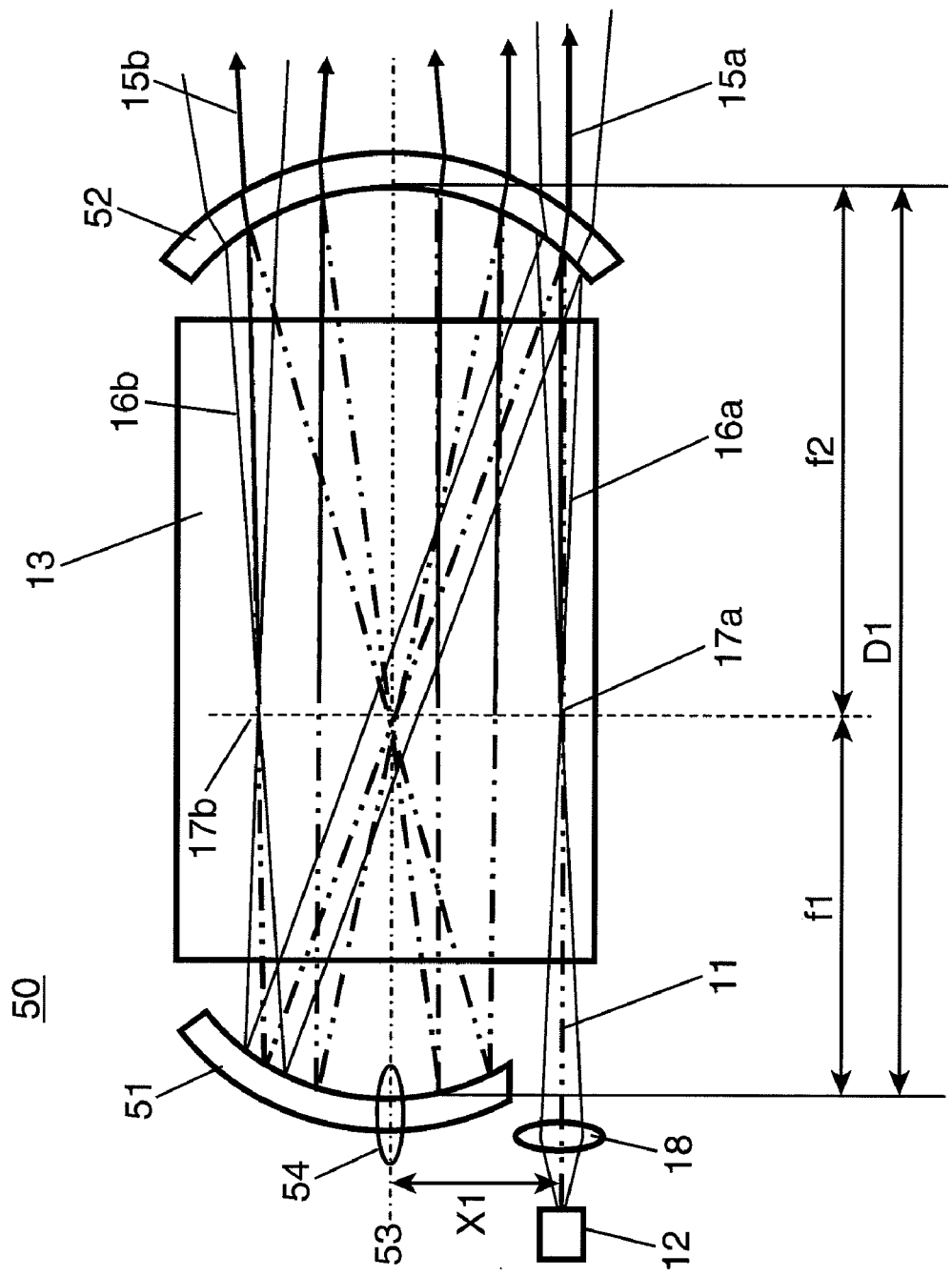
FIG. 4 shows a schematic structure of a wavelength conversion device according to another embodiment of the present invention.

FIG. 4 shows a schematic structure of a wavelength conversion device 50 in accordance with the present embodiment. FIG. 5 shows a schematic structure of a wavelength conversion device 60 in accordance with the present embodiment.

As shown in FIG. 4, the wavelength conversion device 50 of the present embodiment includes a laser light source 12 that emits a fundamental wave 11, a light collecting lens 18 that collects the fundamental wave 11 emitted from the laser light source 12 to be focused onto a predetermined position to a predetermined beam waist diameter, a wavelength conversion element 13 that converts the fundamental wave 11 into a second harmonic wave 15 (15a, 15b), and concave mirrors 51 and 52, each having such curvature that reflects the fundamental wave 11 transmitted through the wavelength conversion element 13, collects the fundamental wave 11 to be focused onto a predetermined position to a predetermined beam diameter, and allows a second harmonic wave 15 to transmit therethrough.

Moreover, the two concave mirrors 51 and 52 are set such that a distance D1 therebetween satisfies the following Equation (2).

$$D1 = \text{Distance in wavelength conversion element } 13 \times \text{Refraction index of wavelength conversion element} + \text{Distance in air} = f1 + f2 \quad (2)$$

In Equation (2), f1 represents a focal distance of the concave mirror 51, and f2 represents a focal distance of the concave mirror 52.

The concave mirror 51 and the concave mirror 52 respectively have coating on the side of the wavelength conversion element 13, which function as wavelength selective mirrors that reflect the fundamental wave and allow the second harmonic wave to transmit therethrough.

A principle of wavelength conversion from a fundamental wave into a harmonic wave in the wavelength conversion device 50 in accordance with the present embodiment will be described herein.

A fundamental wave 11 emitted from the laser light source 12 enters the wavelength conversion element 13 through a portion where the concave mirror 51 is not formed, while being collected by the light collecting lens 18 to be focused onto a predetermined position to a predetermined beam waist diameter 17a. Herein, a position of the light collecting lens 18 is adjusted such that the fundamental wave 11 is collected to a position in vicinity of a position (shown with a dotted line in the figure) spaced away from the concave mirror 51 by the focal distance f1 of the concave mirror 51. A second harmonic wave 15a generated by the wavelength conversion in the wavelength conversion element 13 is output from the wavelength conversion element 13, and is output from the wavelength conversion device 50 after being transmitted through the concave mirror 52. On the other hand, the fundamental wave 11, which has reached the concave mirror 52 after being transmitted through the wavelength conversion element 13, is reflected from the surface on the side of the wavelength conversion element 13 of the concave mirror 52, and enters the wavelength conversion element 13 again. Herein, the fundamental wave 11 in a first path 16a is collected to be focused onto a position spaced away from the concave mirror 52 by the focal distance f2. Therefore, the fundamental wave 11 reflected from the surface on the side of the wavelength conversion element 13 of the concave mirror 52 is folded back into the wavelength conversion element 13 substantially in a horizontal direction. Since the fundamental wave 11 is folded back in a substantially horizontal direction, a power density thereof is not increased. For this reason, the fundamental wave 11 transmits through the wavelength conversion element 13 mostly without being converted into a second harmonic wave, and then reaches the concave mirror 51. The fundamental wave 11 reflected from the concave mirror 51 enters the wavelength conversion element 13 again, and is collected to be focused onto almost at the same position in a lateral direction as that in the first path 16a, to a beam waist diameter 17b. A second harmonic wave 15b generated in a second path 16b is also transmitted through the concave mirror 52, and is output from the wavelength conversion device 50, in the same manner as the second harmonic wave 15a generated in the first path 16a. On the other hand, the fundamental wave 11 reflected from the concave mirror 52 is transmitted through the wavelength conversion element 13 in a substantially horizontal direction almost without being converted into a second harmonic wave, to be reached to the concave mirror 51, in the same manner as the first path 16a.

Herein, the positional relationship of a fundamental wave in each path will be explained. The positional relationship between the fundamental wave in the second path 16b and the lens axis (53 in FIG. 4) is such that the fundamental wave in the second path 16b is at the position above the lens axis 53, as defined by the formula X1×f1/f2, wherein X1 represents a distance between the first path 16a and the lens axis 53. In the third path and paths subsequent to the third path, a second harmonic wave generated by wavelength conversion in a rightward path in FIG. 4 is output from the wavelength conversion device 50 in the rightward direction through the concave mirror 52, as in the second path 16b. On the other hand, the fundamental wave 11, which remains without being converted into the second harmonic wave, is continuously reflected from the concave mirror 51 and the concave mirror 52 so as to reciprocate between the concave mirror 51 and the concave mirror 52. Thus, beam waist positions in the respective rightward paths can be scattered in the wavelength conversion element 13 in a vertical direction in FIG. 4. As a result, it is possible to avoid localization of a fundamental wave and a second harmonic wave and suppress occurrence of a problem of heat generated in the wavelength conversion element 13.

Here, it is known that the beam waist diameter 17a in the first path 16a and the beam waist diameter 17b in the second path 16b hold the condition expressed by the following Equation (3).

$$17b = 17a \times f1/f2 \quad (3)$$

Namely, the latter is the stage, the smaller is the beam waist diameter in the rightward path. Here, by reducing the beam waist diameter 17a of the first path 16a to an extent that the problem of heat generation does not occur, it is possible to improve the wavelength conversion efficiency in each path gradually with a reduction in beam waist diameter until the beam waist diameter does not satisfy the optimal condition expressed by Equation (1) in a path of the predetermined stage. According to the structure of the wavelength conversion device 50 of the present embodiment, it is possible to increase the wavelength conversion efficiency gradually by gradually reducing the beam waist diameter in each path towards a latter stage within the range where the problem of heat generated in the wavelength conversion element does not occur, as in the structure described in the first embodiment. Thus, it is possible to improve overall wavelength conversion efficiency from the fundamental wave into the second harmonic wave in the wavelength conversion element 13.

Herein, the structure wherein each of the concave mirror 51 and the concave mirror 52 has an aspherical structure will be explained. In the case where each of the concave mirrors 51 and 52 of the wavelength conversion device 50 has a spherical structure, generally, as the light incident position becomes away from the lens axis 53 in a vertical direction, a laser light incident onto the concave mirror in a direction parallel with the lens axis 53 is collected at a position shifted toward the concave mirror with respect to a focusing point due to aberration. In the wavelength conversion device 50, accordingly, the fundamental wave 11 in the second path 16b is output from the wavelength conversion element 13 while being slightly tilted to the lens axis 53.

It is therefore preferable that the concave mirror 51 and the concave mirror 52 at least on the side of the wavelength conversion element be formed in an aspherical shape respectively.

As explained in the first embodiment with reference to FIG. 4, it is preferable that the concave mirror 51 and the concave mirror 52 be arranged such that a distance between the concave mirror 51 and the concave mirror 52 is set to a sum of the focal distance f1 of the concave mirror 51 and the focal distance f2 of the concave mirror 52.

According to the foregoing structure, a fundamental wave that enters a position spaced away from the lens axis 53 in parallel with the lens axis 53 is also collected to be focused onto a focusing point, and all the second harmonic wave is output from the wavelength conversion element 13 as a substantially parallel beam.

In the structure of FIG. 4, it is preferable that the concave mirror 52 be a meniscus mirror having an incident plane and an emission plane which are substantially concentric with each other. With this structure, a second harmonic wave with an optical axis substantially parallel with the lens axis 53 can be output from the wavelength conversion device 50 while being maintained in substantially parallel beam. Thus, the second harmonic wave can be collected to a smaller diameter with ease. For this reason, the foregoing structure is suitably applied to the case where the second harmonic wave is collected on a rod integrator or the like.

In the case where a spherical mirror is adopted for at least one of the concave minor 51 and the concave mirror 52, the fundamental wave that reciprocates between the concave minor 51 and the concave minor 52 gradually approaches the lens axis 63 in a latter stage, but is gradually spaced away from the lens axis 53 in the predetermined stage as being influenced by aberration of the spherical mirror. In this case, the fundamental wave propagates near the first path 16a in the reverse direction, and returns to the laser light source 12 via the light collecting lens 18. Desirably, this problem is avoided because it exerts an adverse effect on stable oscillation of the laser light source 12.

In contrast, according to the structure of the present embodiment wherein an aspherical mirror is adopted for both of the concave mirror 51 and the concave minor 52, the fundamental wave 11 finally approaches the lens axis 53. Therefore, it is possible to prevent a problem associated with the case of adopting a spherical minor, i.e., the fundamental wave 11 returns the laser light source 12. The fundamental wave 11, which is finally left without being converted into a second harmonic wave, is extracted from the wavelength conversion device 50 by removing a fundamental wave reflective coating from a center 54 of the concave minor 51, and is treated using a diffuser with safety. Thus, it is possible to prevent a problem of the fundamental wave 11 as return light and stray light to the laser light source 12. Instead of removing the reflection coating, the center 54 of the concave mirror 51 irradiated with the fundamental wave may be cut off.

Another structure which prevents the fundamental wave 11 from returning to the laser light source 12 will be described herein below with reference to FIG. 5.

Figure 5:
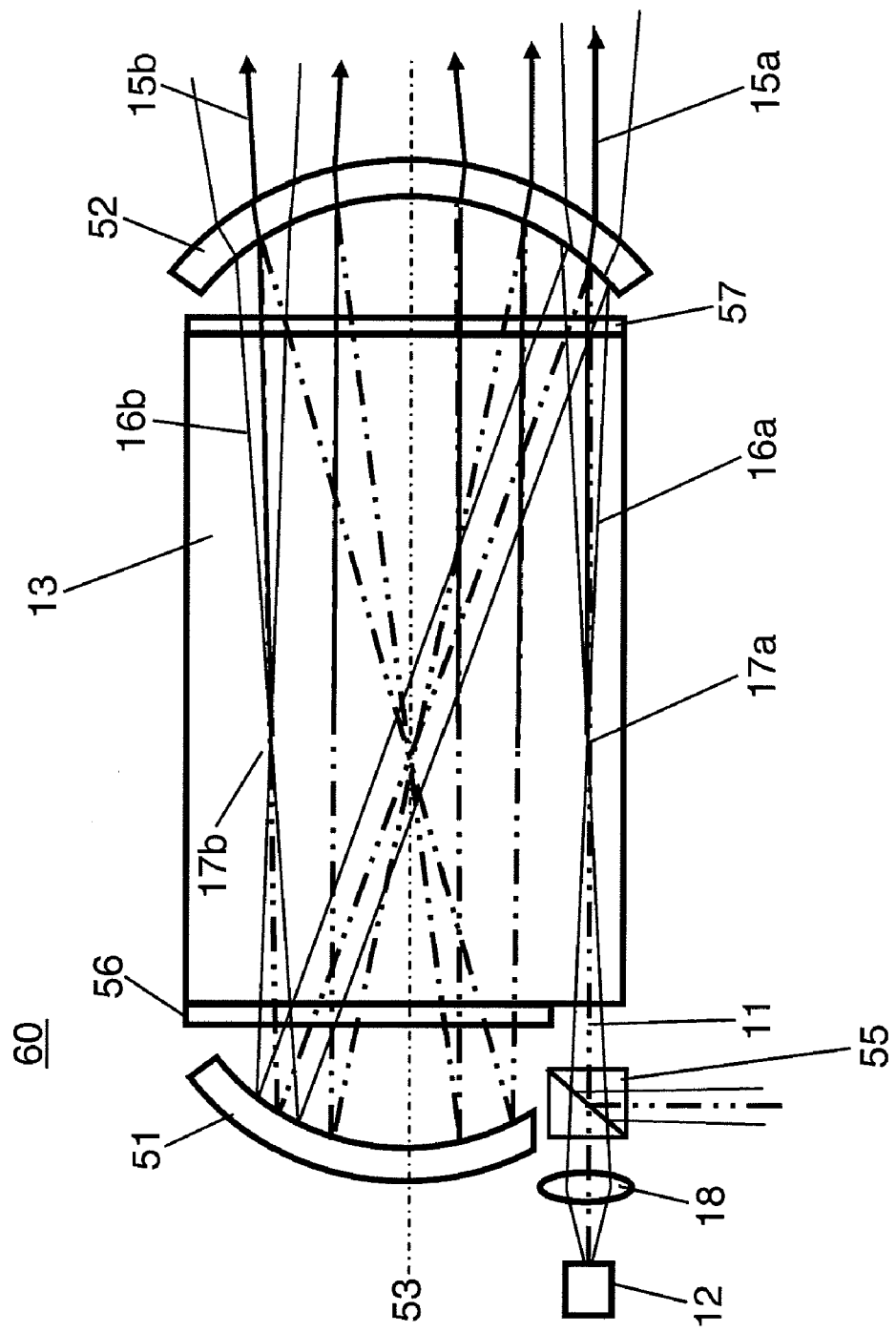
FIG. 5 shows a schematic structure of a wavelength conversion device according to another embodiment of the present invention.

The wavelength conversion device 60 shown in FIG. 5 has a basic structure common with the wavelength conversion device 50 shown in FIG. 4. Accordingly, members that are common with the wavelength conversion device 50 are assigned with the same reference numerals and the explanation thereof is appropriately omitted.

In addition to the structure of the wavelength conversion device 50, the wavelength conversion device 60 includes a polarization beam splitter 55, a λ/4 wavelength plate 56 formed on a concave minor 51-side end surface of the wavelength conversion element 13, and a λ/4 wavelength plate 57 formed on a concave minor 52-side end surface of the wavelength conversion element 13.

A principle of wavelength conversion from a fundamental wave into a harmonic wave in the wavelength conversion device 60 in accordance with the present embodiment will be described herein.

The wavelength conversion element 13 of the wavelength conversion device 60 has a crystal axis direction which is perpendicular to a plane of FIG. 5. The polarization beam splitter 55 allows a polarized light in a direction perpendicular to the plane of the figure to transmit therethrough, and reflects a polarized light in a direction parallel to the plane of FIG. 5.

It is assumed herein that the fundamental wave 11 emitted from the laser light source 12 is polarized in the direction perpendicular to the plane of FIG. 5. In this case, the fundamental wave 11, emitted from the laser light source 12 and transmitted through the polarization beam splitter 55, is partially converted into a second harmonic wave 15a in the first path 16a in the same manner as in the wavelength conversion device 50. However, in the wavelength conversion device 60, when the second harmonic wave 15a is transmitted through the λ/4 wavelength plate 57 provided on the outlet port side, both the fundamental wave 11 and the second harmonic wave 15a are rotated and polarized. Then, the fundamental wave 11 reflected from the concave mirror 52 enters the λ/4 wavelength plate 57 before being entered to the wavelength conversion element 13 again. Namely, since the fundamental wave 11 enters the λ/4 wavelength plate 57 twice, the fundamental wave 11 is shifted by a λ/2 wavelength in total. As a result, a polarization direction of the fundamental wave 11 that enters the wavelength conversion element 13 in the leftward direction in FIG. 5 the figure corresponds to a horizontal direction in a plane of FIG. 5.

According to the structure of the wavelength conversion device 60, irrespective of a beam diameter, in the leftward path, the fundamental wave 11 is output from the wavelength conversion element 13 without being converted into a second harmonic wave at all. The fundamental wave 11, which is output from the wavelength conversion element 13 and is incident onto the λ/4 wavelength plate 56, is reflected from the concave mirror 51 to be incident onto the λ/4 wavelength plate 56 again, after being rotated and converted into a λ/4 polarized beam. Thus, the polarization direction of the fundamental wave 11 that enters the wavelength conversion element 13 in the second path 16b is perpendicular to the plane of FIG. 5. The fundamental wave 11 in the second path 16b is therefore partially converted into a second harmonic wave in the wavelength conversion element 13, and is then output from the wavelength conversion element 13.

That is, the fundamental wave, which propagates rightward in FIG. 5, is polarized in the direction perpendicular to the plane of FIG. 5. On the other hand, the fundamental wave, which propagates leftward in FIG. 5, is polarized in the direction parallel to the plane of FIG. 5. With the structure adopting a spherical mirror for each of the concave mirrors 51 and 52, even when a fundamental wave, which is left without being converted into a second harmonic wave, propagates through a position, which is equal to that in the first path 16a, in a reverse direction, this fundamental wave is reflected from the polarization beam splitter 55 in the downward direction of FIG. 5. For this reason, the fundamental wave never returns to the laser light source 12. Thus, it is possible to avoid the problem of the stray light or return light in such a manner that the fundamental wave is appropriately treated using a diffuser or the like.

Incidentally, the foregoing effects as achieved from the present embodiment can be achieved also from the structure described in the first embodiment. More specifically, according to the structure of the wavelength conversion device 10 of the first embodiment (FIG. 1), by providing λ/4 wavelength plates on both the left end and the right end of the wavelength conversion element 13, second harmonic wave can be output only in one direction in the plane of FIG. 1.

As in the wavelength conversion device 60 (FIG. 5), for example, the λ/4 wavelength plate and the polarization direction of the fundamental wave 11 are set such that a second harmonic wave is generated only in the leftward direction in the plane of FIG. 1. Thus, the second harmonic wave can be output only from the left side of the wavelength conversion element 13 in the plane of FIG. 1. Then, only the fundamental wave is extracted from the wavelength conversion device 10 through the final path 16e on the right side in the plane of FIG. 1. As a result, it is possible to separate the fundamental wave and the second harmonic wave with ease.

It is needless to say that the wavelength conversion element 13 according to the present embodiment is applicable to a bulk-type element. Moreover, the wavelength conversion element 13 according to the present embodiment is also applicable to a slab-type waveguide.

It is needless to say that the wavelength conversion element 13 according to the present embodiment is applicable to a bulk-type element as in the wavelength conversion element 13 according to the first embodiment. Moreover, the wavelength conversion element 13 according to the present embodiment is also applicable to a slab-type waveguide.

Third Embodiment

Still another embodiment of the present invention will be described herein below with reference to FIG. 6A through FIG. 8B.

Figure 6A:
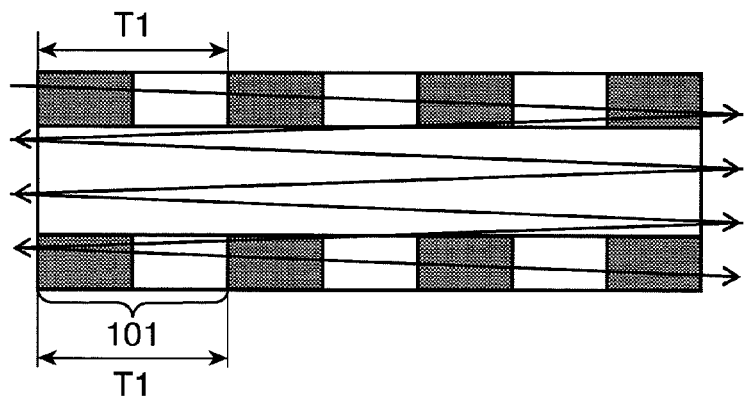
FIG. 6A is an explanatory view showing a conventional polarization inversion structure of a conventional wavelength conversion element according to another embodiment of the present invention.
Figure 6B:
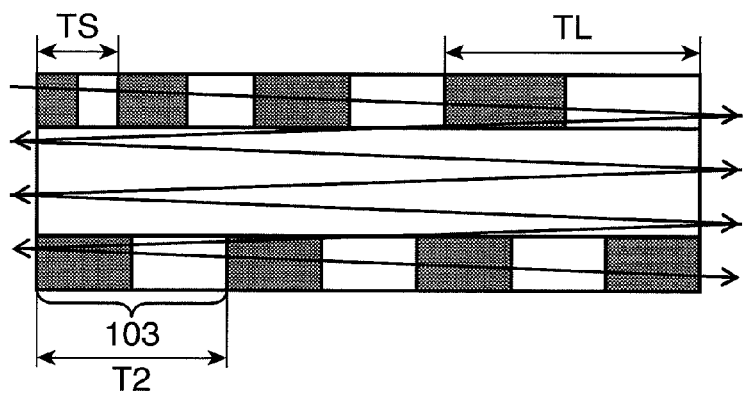
FIG. 6B is an explanatory view showing one example of a polarization inversion structure of the waveform conversion element according to another embodiment of the present invention.
Figure 6C:
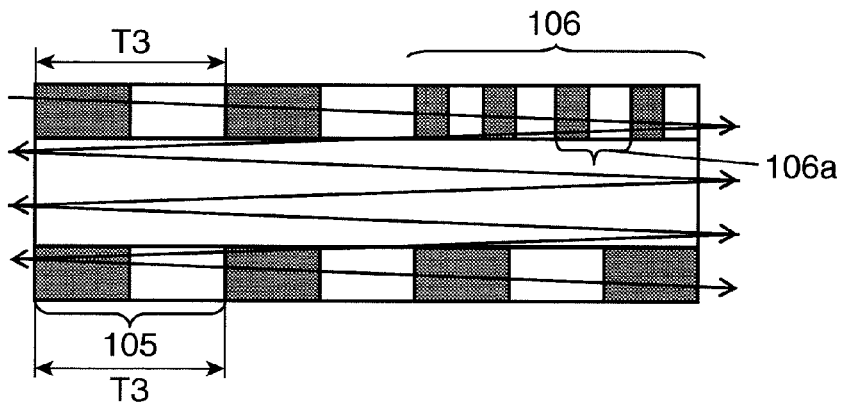
FIG. 6C is an explanatory view showing another example of a polarization inversion structure of the wavelength conversion element according to another embodiment of the present invention.
Figure 7A:
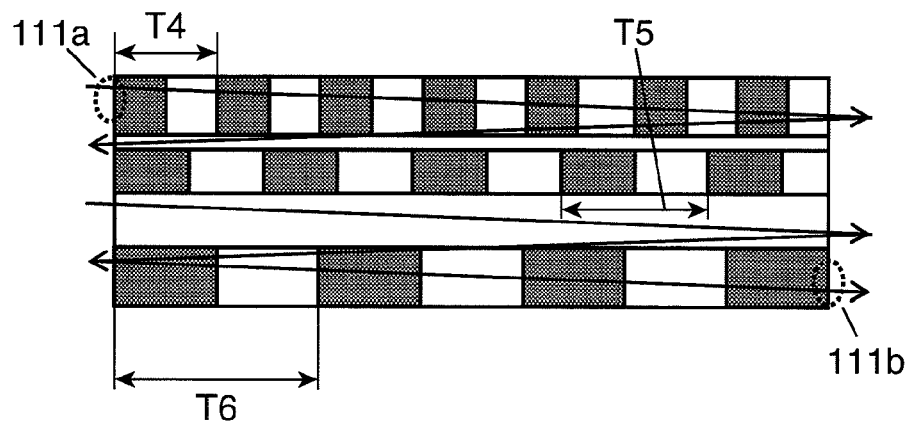
FIG. 7 is an explanatory view showing another example of a polarization inversion structure of a wavelength conversion element according to another embodiment of the present invention.
Figure 7B:
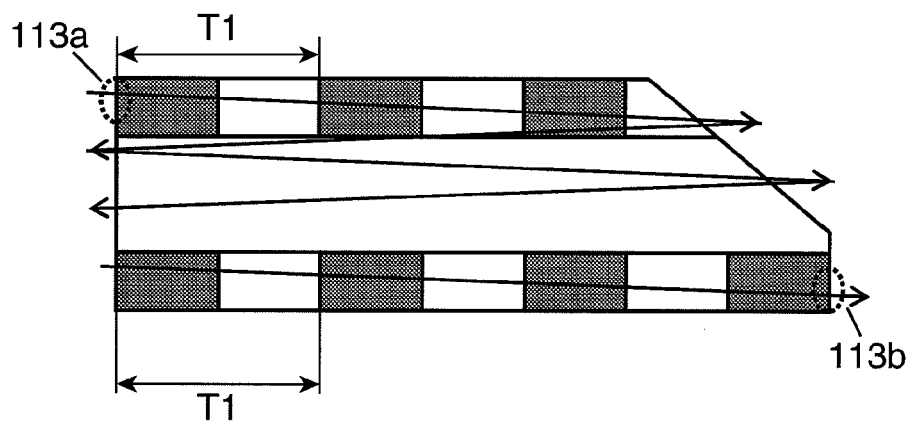

FIG. 6A is an explanatory view showing a conventional polarization inversion structure of a conventional wavelength conversion element. FIG. 6B is an explanatory view showing one example of a polarization inversion structure of a waveform conversion element according to the present embodiment. FIG. 6C is an explanatory view showing another example of a polarization inversion structure of a wavelength conversion element according to the present embodiment. FIG. 7A is an explanatory view showing another example of a polarization inversion structure of a wavelength conversion element according to the present embodiment. FIG. 7B is an explanatory view showing another example of a polarization inversion structure of a wavelength conversion element according to the present embodiment.

As shown in FIG. 6A, in a conventional wavelength conversion element 100, polarization inversion structures 101 with a period T1 are arranged along an optical path to the entire wavelength conversion element 100. According to the wavelength conversion element 100 with the foregoing polarization inversion structure, it is possible to realize a high-efficient wavelength conversion with phase matching.

In contrast, the wavelength conversion device of the present embodiment is provided with a wavelength conversion element 102 having a polarization inversion structure shown in FIG. 6B. Other than the polarization inversion structure, the wavelength conversion device of FIG. 6B has a common basic structure with the wavelength conversion devices of the first and second embodiments. Accordingly, members that are common with the wavelength conversion device 10 are assigned with the same reference numerals and the explanation thereof is appropriately omitted. Therefore, the drawings of wavelength selective mirrors 14a to 14d that are shown in FIG. 1 and FIG. 2 are omitted.

In the wavelength conversion element 102 of the present embodiment, for example, as shown in FIG. 6B, polarization inversion periods that form a first path have a range from TS to TL.

Generally, it is known that in the case where a polarization inversion period is shifted from the phase matching conditions, a fundamental wave can be converted into a second harmonic wave only with low wavelength conversion efficiency. In the present embodiment, the plurality of polarization inversion periods that form the first path widely range from TS corresponding to the shortest period to TL corresponding to the longest period in order to suppress the wavelength conversion efficiency in the first path. Specifically, in the case where the polarization inversion structure 103 of the wavelength conversion element 102 has a period T2 of 7.000 μm, the period of the first optical path ranges from TS of around 9.995 μm to TL of around 7.000 μm. The width of the polarization inversion period of the portion that forms the optical path in a former stage is increased and is gradually reduced to a latter stage, i.e., the polarization inversion period is made even, so that the wavelength conversion efficiency in a latter stage can be improved without controlling a beam diameter for each path. Thus, it is possible to realize a wavelength conversion device capable of performing wavelength conversion from a fundamental wave into a second harmonic wave with high wavelength conversion efficiency while avoiding a problem of a decrease in wavelength conversion efficiency due to heat generated in a wavelength conversion element.

Desirably, the width of the polarization inversion period is designed such that the problem of the heat generated in the wavelength conversion element does not occur even in the case where a fundamental wave having a predetermined intensity of light with any small beam diameter enters the wavelength conversion element 102 irrespective of a size of a beam diameter. Thus, it is possible to prevent reduction in wavelength conversion efficiency into a second harmonic wave due to heat generated in the wavelength conversion element, without requiring precise control of a beam diameter of a fundamental wave in each stage. Furthermore, the foregoing structure is advantageous in that the required curvature accuracy in a wavelength selective mirror (not shown) can be alleviated.

A wavelength conversion element 104 having a polarization inversion structure shown in FIG. 6C may be used as the wavelength conversion element in the wavelength conversion device of the present embodiment. In the wavelength conversion element 104, as shown in FIG. 6C, a polarization inversion structure 105 having a period T3 that contributes to wavelength conversion is formed in a part of a first path, and a dummy region 106 that does not contribute to wavelength conversion is formed in a part other than the part where the polarization inversion structure 105 having the period T3 is formed. Desirably, a polarization inversion structure 106a having a period which is significantly different from the period T3 that contributes to wavelength conversion is formed in the dummy region 106.

Specifically, in the case where the period T3 of the polarization inversion structure 105 is 7.000 μm, the polarization inversion period of the polarization inversion structure 106a may be set to around 7.1000 μm. Thus, it is possible to suppress generation of a refraction index change (photodamage) induced by a second harmonic wave generated in the wavelength conversion element 104. Hence, it is possible to extract a second harmonic wave from the wavelength conversion element 104 with a profile of a fundamental wave and a profile of the second harmonic wave maintained at high quality. As a result, it is possible to provide a wavelength conversion device capable of generating quality second harmonic wave even at high power.

A wavelength conversion element 110 having a polarization inversion structure shown in FIG. 7A may be used as the wavelength conversion element in the wavelength conversion device according to the present embodiment.

As shown in FIG. 7A, the wavelength conversion element 110 has such a structure that a period of polarization inversion differs in each stage of wavelength conversion. In FIG. 7A, T4 represents a period of polarization inversion in an optical path located near an inlet port 111a, T5 represents a period of polarization inversion in a certain stage located between the inlet port 111a and an outlet port 111b, and T6 represents a period of polarization inversion in a final stage. Herein, the period T4 is 7.000 μm, the period T5 is 7.001 μm, and the period T6 is 7.002 μm, for example.

Further, where the temperature of a Peltier element (not shown) is controlled so that the output of the very last stage is maximized, it is possible to reduce the size of the wavelength conversion device and increase overall wavelength conversion efficiency from the fundamental wave to the second harmonic wave in the wavelength conversion element 110, while suppressing the conversion efficiency in an optical path of a former stage and avoiding the problem caused by the heat generated in the wavelength conversion element.

Further, the effect similar to that described above can be also demonstrated in a structure in which the period is gradually shortened, for example, as T4=7.002 μm, T5=7.001 μm, T6=7.000 μm, and the temperature of the Peltier element is controlled so that output of the very last stage is maximized. In the structure shown in FIG. 7A, it is preferable that a period shorter than T4, a period longer than T6 be provided, and each period be set with a margin. With this structure, even when the power of the fundamental wave is changed, such incident position that permits the highest wavelength conversion efficiency can be found by sliding the incidence position of the fundamental wave of the first path within the range where the problem of heat generated in the wavelength conversion element does not occur. As a result, the same wavelength conversion element can be used even for the fundamental waves of different output. Therefore, the production cost can be reduced.

For the wavelength conversion element in the wavelength conversion device according to the present embodiment, the wavelength conversion element 112 having a polarization inversion structure shown in FIG. 7B may be used.

The wavelength conversion element 112 shown in FIG. 7B is obtained by cutting the conventional wavelength conversion element 100 shown in FIG. 6A into a trapezoidal shape. In the wavelength conversion element 112, an inlet port 113a is formed at a shorter side of the trapezoidal shape while an outlet port 113b is formed at a longer side of the trapezoidal shape. As described, also by simply making the optical path in a former stage shorter than the optical path in a latter stage in the wavelength conversion element 112, it is possible to reduce the size of the wavelength conversion device and improve an overall wavelength conversion efficiency from a fundamental wave into a second harmonic wave in the wavelength conversion element 112, while suppressing wavelength conversion efficiency in an optical path in a former stage, to avoid a problem of heat generated in the wavelength conversion element 112.

According to the structure of the wavelength conversion element 112, even in a case of use of a fundamental wave having a high power, a single wavelength conversion element can be used in such a manner that the wavelength conversion element is cut to have a shorter length. Therefore, there is no necessity of designing and manufacturing various wavelength conversion elements in accordance with a power of a fundamental wave. As a result, it is possible to reduce manufacturing costs.

Figure 8A:
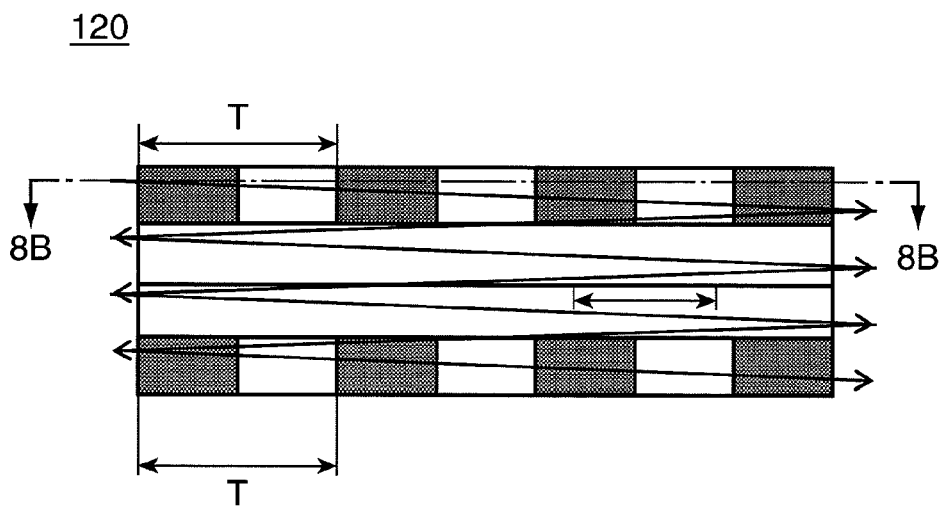
FIG. 8A is an explanatory view showing another example of a polarization inversion structure of a wavelength conversion element according to another embodiment of the present invention.
Figure 8B:
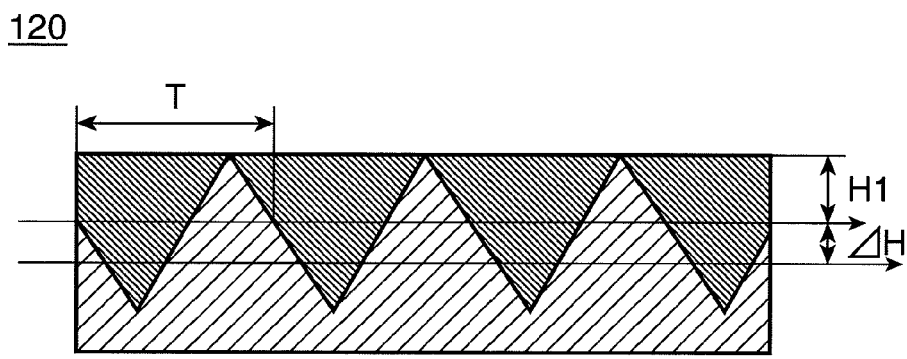
FIG. 8B is an explanatory view showing a section taken along a line 8B-8B shown in FIG. 8A.

FIG. 8A is an explanatory view showing another example of a polarization inversion structure of a wavelength conversion element 120 according to the present embodiment. FIG. 8B is an explanatory view showing a section taken along a line 8B-8B shown in FIG. 8A. The polarization inversion structure is generally formed to have a sawtooth shape in the thickness direction, as shown in FIG. 8B. Typically, where the fundamental wave propagates through portions with a depth H1 shown in FIG. 8B in which the duty ratio of polarization inversion is 50%, the wavelength conversion efficiency can be maximized. Therefore, for paths in the second half in which high conversion efficiency is desired, it is preferable that the fundamental wave propagates through portions in vicinity of portions with a depth H1. On the other hand, for paths in the first half in which wavelength conversion at a high conversion efficiency is wished to be avoided, as shown in FIG. 8B, similar effects as achieved from the structure of the first embodiment can be achieved by causing the fundamental wave to propagate through positions, for example, shifted by ΔH, as shown in FIG. 8B, in which the duty ratio is shifted from 50%.

In the case of adopting the polarization inversion structure in the path in a former stage, for example, it is possible to reduce such wavelength conversion efficiency from the fundamental wave that propagates in portions with ΔH of about 200 μm (which may be shifted above or below the depth H1). With the foregoing structure of the present embodiment, it is possible to provide a compact size wavelength conversion device which improves overall efficiency of wavelength conversion. With this structure wherein the position of the beam is shifted vertically in the wavelength conversion element 120; it is possible to reduce the width of the wavelength conversion element 120 as compared with the case where paths which are equal in number to that in the present embodiment but are simply arranged in a widthwise direction, and to further reduce the size of the wavelength conversion element. Even in the case where the power of the fundamental wave is increased, it is possible to reduce the wavelength conversion efficiency with ease by making the fundamental wave propagate through portions with large ΔH. Therefore, it is not necessary to design and produce the wavelength conversion elements of different kinds according to powers of the fundamental wave power, thereby reducing production costs.

Fourth Embodiment

Yet another embodiment of the present invention will be described herein below with reference to FIG. 4, FIG. 9 and FIG. 10.

Figure 9:
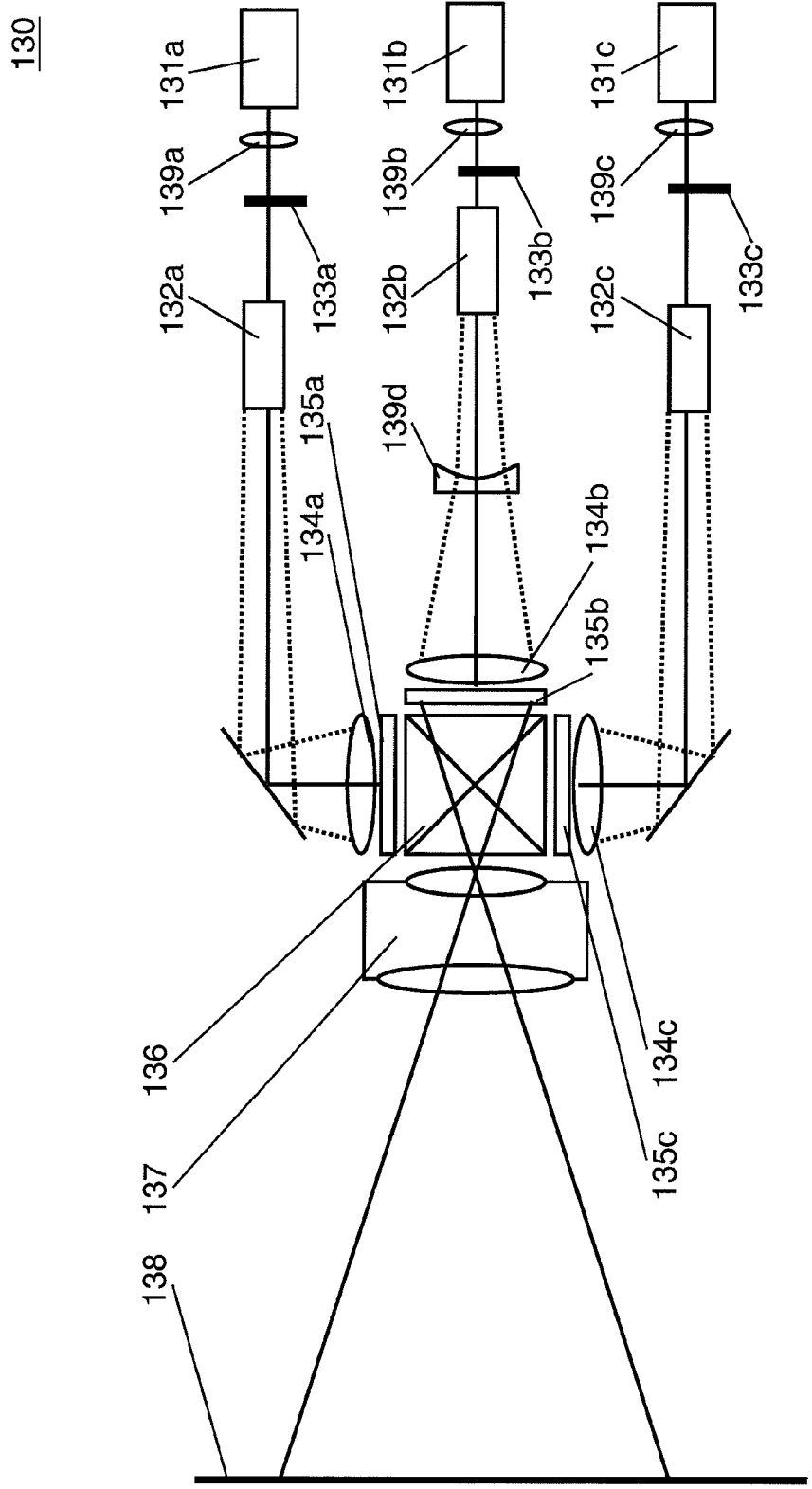
FIG. 9 is an explanatory view showing a schematic structure of an image display apparatus according to another embodiment of the present invention.

FIG. 9 shows a schematic structure of an image display apparatus according to the present embodiment. The image display apparatus according to the present embodiment may include the wavelength conversion device according to each of the first through third embodiments. The schematic structure of the image display apparatus 130 according to the present embodiment will be described herein below.

As shown in FIG. 9, the image display apparatus 130 according to the present embodiment includes a red laser light source (R light source) 131a, a green laser light source (G light source) 131b and a blue laser light source (B light source) 131c. The red laser light source (R light source) 131a is a laser diode made of an AlGaInP/GaAs-based material having a wavelength of 640 nm. The blue laser light source (B light source) 131c is a laser diode made of a GaN-based material having a wavelength of 450 nm. The green laser light source (G light source) 131b is the wavelength conversion device described in any one of the first through third embodiments.

As shown in FIG. 9, the image display apparatus 130 according to the present embodiment includes lenses 139a, 139b and 139c, rotary lens arrays 133a, 133b and 133c, rod integrators 132a, 132b and 132c, field lenses 134a, 134b and 134c, and liquid crystal panels 135a, 135b and 135c provided in correspondence with the laser light sources 131a, 131b and 131c, respectively. The rod integrators 132a, 132b and 132c are used for performing uniform exposure on the relevant laser light sources 131a, 131b and 131c. The image display apparatus 130 further includes a cross prism 136, a projection lens 137, a screen 138 and a lens 139d. Next, operations of the image display apparatus 130 according to the present embodiment will be described. A fundamental wave laser light emitted from the laser light source (131a, 131b, 131c) is formed into a substantially parallel light by the lens (139a, 139b, 139c), and is then entered into the rod integrator (132a, 132b, 132c) through the rotary lens array (133a, 133b, 133c). When the fundamental wave laser light passes through the rotary lens array (133a, 133b, 133c), a pattern thereof is modulated in a time series manner. Thus, it is possible to form a desirable image from which speckle noise is removed. The fundamental wave laser light is subjected to conversion in the rod integrator (132a, 132b, 132c) so as to have a substantially uniform exposure pattern, and is then reached to the liquid crystal panel (135a, 135b, 135c) via the field lens (134a, 134b, 134c). Herein, the liquid crystal panel (135a, 135b, 135c) is exposed to this laser light. Then, the R laser light, the G laser light and the B laser light are multiplexed in the cross prism 136 to form an image on the screen 138 through the projection lens 137. The lens 139d is provided in the optical path from the G light source 131b to compensate for the optical path lengths in consideration of respective optical path lengths for the R beam and the B beam.

Figure 10:
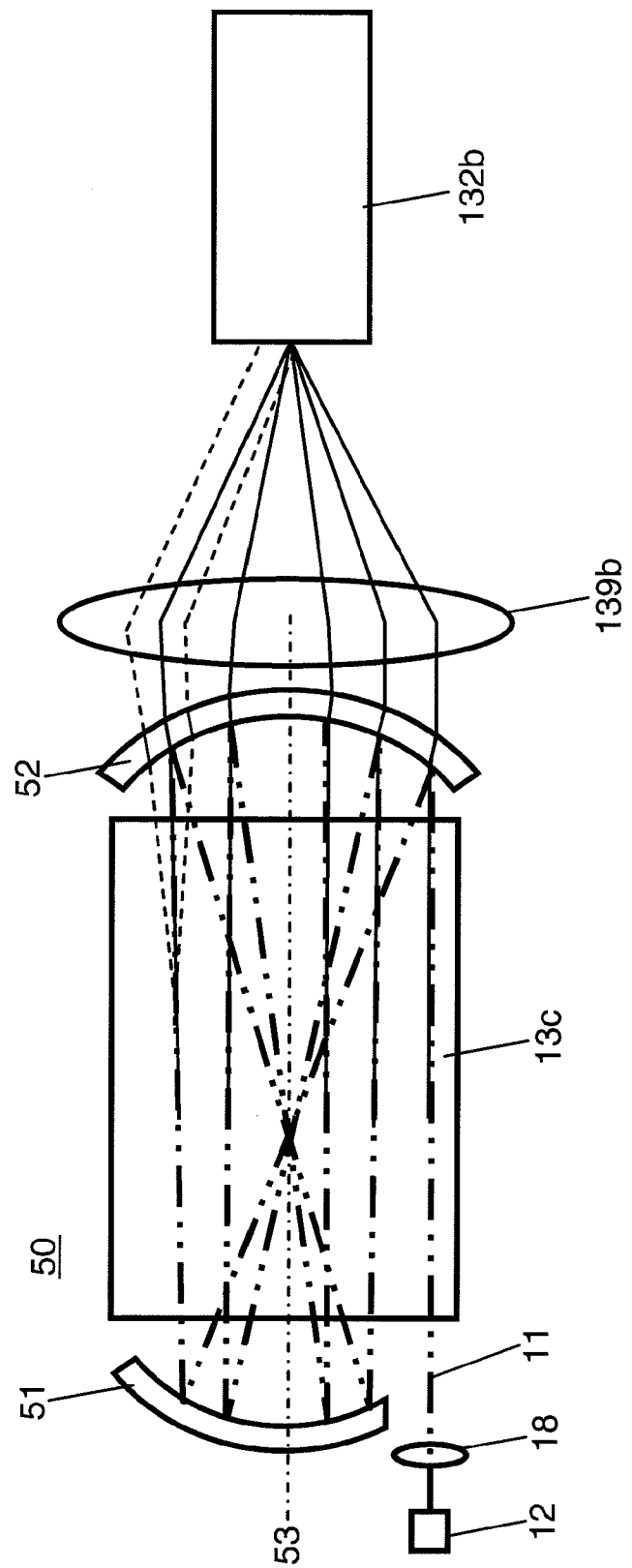
FIG. 10 is an explanatory view showing a schematic structure of a wavelength conversion device according to another embodiment of the present invention.

In the image display apparatus 130 according to the present embodiment, as shown in FIG. 10, the multiple second harmonic wave laser lights described in the first through third embodiments are collected onto the rod integrator 132b by the lens 139b. Thus, it is possible to realize a compact and high-efficiency image display apparatus.

More specifically, each second harmonic wave emitted from the wavelength conversion device 50 (FIG. 4) described in the second embodiment is collected by the lens 139b on the rod integrator 132b (FIG. 10). In this case, it is preferable that the lens 139b be provided in such a manner that each second harmonic wave be converted by the lens 139b to an almost parallel beam. With this structure, on the incidence end surface of the rod integrator 132b, the second harmonic wave from each angle of view is collected, while being maintained in a parallel beam, and can be collected to a small beam diameter of not larger than several millimeters. Therefore, a fine rod integrator can be used. Furthermore, since the laser beam can be made uniform within a distance of a short rod integrator, it is possible to realize a compact and high-efficient image display apparatus 130. It is preferable that aspherical mirrors be used for the concave mirrors 51, 52 in the structure shown in FIG. 10. As described in the second embodiment, by adopting the aspherical mirrors, the second harmonic waves emitted from the wavelength conversion device 51 can be made substantially parallel to the lens axis 53. Therefore, it is possible to make the collected beam diameter smaller at the incident end surface of the rod integrator 132b, which in turn makes it possible to further reduce the size of the image display apparatus 130. Furthermore, in the structure shown in FIG. 10, the incident angle of the second harmonic wave that enters the rod integrator 132b depends only on the distance of the second harmonic wave emitted from each path (first path, second path) from the lens axis 53 and does not depend on the profile of each second harmonic wave (beam diameter, shape, and spread angle). Therefore, even if the profile of the fundamental wave emitted from the laser light source 12 fluctuates, the respective positions of the second harmonic wave in the first path and the second path do not change. As a result, the incident angle of the second harmonic wave on the rod integrator 132b does not change and therefore the second harmonic wave emitted from the rod integrator 132b is not affected by the beam diameter, spread angle and also profile variations of the laser light source 12. As a result, the image display apparatus 130 of the present embodiment adopting the above-described wavelength conversion device can display quality images free from fluctuations in brightness evenness.

Fifth Embodiment

Yet another embodiment of the present invention will be described herein below with reference to FIG. 10 and FIG. 11.

Figure 11:
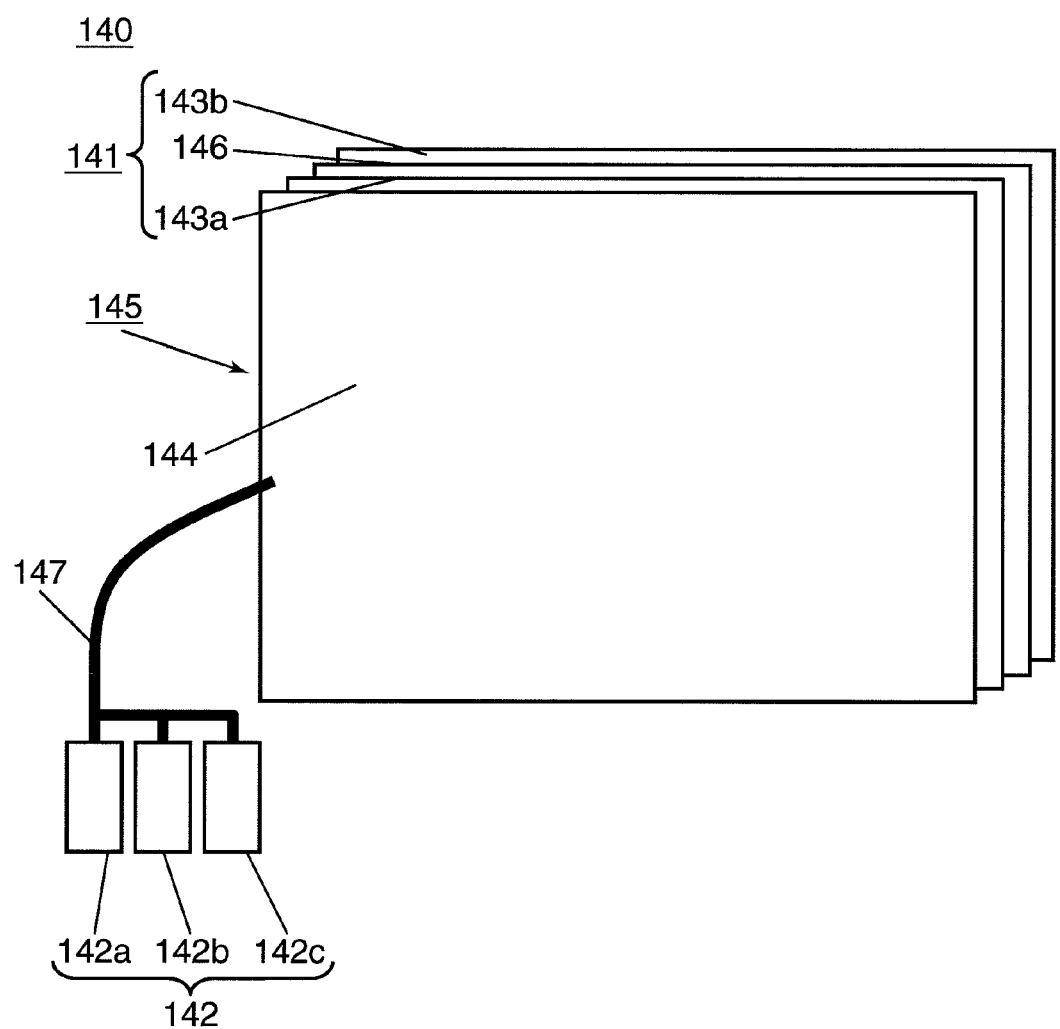
FIG. 11 is an explanatory view showing schematic structure of an image display apparatus according to another embodiment of the present invention.

FIG. 11 shows a schematic structure of an image display apparatus according to the present embodiment in which a backlight device includes a G laser light source. This G laser light source may be the G laser light source described in each of the first through fourth embodiments. As shown in FIG. 11, the image display apparatus 140 according to the present embodiment includes a liquid crystal display panel 141, and a backlight device 145 that illuminates the liquid crystal display panel 141 from the back. The liquid crystal display panel 141 includes sheet polarizers 143a and 143b, and a liquid crystal sheet 146 interposed between the sheet polarizers 143a and 143b. The backlight device 145 includes a laser light source 142, an optical guide plate 144 and a fiber bundle 147. The laser light source 142 is configured with an R laser light source 142a, a G laser light source 142b and a B laser light source 142c. The fiber bundle 147 bundles laser lights to guide the laser lights to the optical guide plate 144.

As in the fourth embodiment, the R laser light source 142a is made of an AlGaInP/GaAs-based material to emit a semiconductor laser light having a wavelength of 640 nm, and the B laser light source 142c is made of a GaN-based material to emit a semiconductor laser light having a wavelength of 450 nm. Moreover, the G laser light source 142b is the wavelength conversion device according to any of the first through third embodiments.

Next, operations of the image display apparatus 140 according to the present embodiment will be described. Laser lights emitted from the R laser light source 142a, the G laser light source 142b and the B laser light source 142c are bundled by the fiber bundle 147, and thereby are formed into a white light. Then, the white light is guided into the optical guide plate 144 and is dispersed in the optical guide plate 144. The optical guide plate 144 may be a diffuser over which diffusion beads are scattered. By adopting such diffuser, it is possible to obtain a laser light having substantially uniform intensity distribution. The liquid crystal panel 141 is illuminated with the laser light output from a surface (not shown) of the optical guide plate 144. More specifically, the sheet polarizer 143a illuminates the liquid crystal sheet 146 using only polarized light in a predetermined direction of the illumination light from the optical guide plate 144. Then, the light, transmitted through the sheet polarizer 143b arranged in a crossed nichols state with respect to a polarization direction of the sheet polarizer 143a, is visually recognized as an image.

According to the foregoing structure, the G laser light source 142b is the wavelength conversion device according to each of the first through third embodiments, and couples the multiple laser lights described in each of the first through third embodiments to the fiber bundle 147. Therefore, the use of the optical system shown in FIG. 10 allows collection of multiple laser lights onto an end of a fiber such that the multiple laser lights are coupled to one another. More specifically, the fiber may be used in place of the rod integrator 132 described in the fourth embodiment (FIG. 10) in order to couple the multiple laser lights onto the fiber bundle 147. As a result, even if the profile of the fundamental wave emitted from the fundamental wave laser light source 12 has changed, the incident angle of the second harmonic wave that enters the fiber bundle 147 does not change. Therefore, the second harmonic wave emitted from the fiber bundle 147 is hardly affected by the beam diameter, spread angle, and profile fluctuations of the laser light source 12, and the image display apparatus 140 can display a quality image free from fluctuations of brightness evenness. In this case, the fiber bundle 147 is used as a means for guiding light to the light guide plate 144, but it is also possible to guide the light with a rod integrator, combine the R, G, B laser beams in the cross prism, and introduce the light into the light guide plate 144 in the same manner as in the fourth embodiment.

According to the foregoing structure, it is possible to realize a compact and high-efficiency liquid crystal display apparatus 140 by using a large number of laser beams as described in the first through third embodiments.

As described above, a wavelength conversion device according to one aspect of the present invention includes a laser light source that emits a fundamental wave; a wavelength conversion element that converts the fundamental wave into a second harmonic wave; and an optical system including a wavelength selective mirror that reflects the fundamental wave transmitted through the wavelength conversion element without being converted into the second harmonic wave, while transmitting therethrough the second harmonic wave generated by wavelength conversion, wherein the optical system makes the fundamental wave transmitted through the wavelength conversion element without being converted into the second harmonic wave enter the wavelength conversion element again to be subjected to wavelength conversion once or more than once, while being focused by the wavelength selective mirror, and the conversion efficiency in at least one of the second stage and stages subsequent to the second stage is higher than the conversion efficiency in the first stage, where the conversion efficiency in each stage is defined as: (a second harmonic wave generated in one stage)/(a square of the fundamental wave entered in said one stage).

According to the foregoing structure, the optical system is arranged such that the wavelength conversion efficiency in the first stage is set lower than the wavelength conversion efficiency in at least one of the second stage and stages subsequent the second stage. With this structure, in the first stage, the wavelength conversion efficiency is held low. Therefore, although the intensity of the fundamental wave is high and a significant amount of heat is generated in the first stage by absorbing light in the wavelength conversion element, it is possible to prevent a reduction in wavelength conversion efficiency even in the case where a high-power fundamental wave is entered in the first stage of the wavelength conversion element. Moreover, the fundamental wave is entered into the wavelength conversion element a plurality of times by the optical system. With this structure, it is possible to reduce an overall size of the wavelength conversion device. As a result, it is possible to provide a compact size wavelength conversion device, which is capable of performing wavelength conversion with improved efficiency.

With the foregoing structure, it is preferable that a conversion efficiency $\eta$ from the fundamental wave entered the first stage at a predetermined intensity of light into a second harmonic wave satisfy the condition of:

$$\eta < (1.068 \times 2\omega^3 \times d_{\it eff}^2 \times L)/(\pi \times \in_o \times c^4 \times n_w^2)$$

(where $\omega$ is an angular frequency of the fundamental wave, $d_{\it eff}$ is an effective nonlinear optical constant, L is a length of the wavelength conversion element, $\in_o$ is a dielectric constant of vacuum, $n_w$ is a refractive index with respect to the fundamental wave, and c is a speed of light); and the optical system is arranged such that a beam waist diameter of the fundamental wave that enters at least one of the second stage and stages subsequent to the second stage is smaller than a beam waist diameter of the fundamental wave that enters the first stage.

It has been found that in the case of generating a second harmonic wave by inputting the fundamental wave in the wavelength conversion element only once, the second harmonic wave $P_{2w}$ obtained from the fundamental wave under optimum light collecting conditions is $(1.068 \times 2\omega^3 \times d_{\it eff}^2 \times L)/(\pi \times \in_o \times c^4 \times n_w^2)$ at maximum.

In view of the foregoing, the above described wavelength conversion device is arranged such that the wavelength conversion efficiency $\eta$, from the fundamental wave having the predetermined intensity of light that enters the wavelength conversion element in the first stage, into the second harmonic wave satisfies the relation of $\eta < (1.068 \times 2\omega^3 \times d_{\it eff}^2 \times L)/(\pi \times \in_o \times c^4 \times n_w^2)$. Further, the optical system is set such that the beam waist diameter of the fundamental wave that enters the wavelength conversion element in at least one of the second stage and stages subsequent to the second stage becomes smaller than the beam waist diameter of the fundamental wave that enters the wavelength conversion element in the first stage. That is, the wavelength conversion device suppresses the wavelength conversion efficiency $\eta$ in the first stage such that the wavelength conversion efficiency $\eta$ becomes smaller than a maximum value so as to satisfy the right side of the expression described above.

Furthermore, according to the foregoing structure of the wavelength conversion device, the wavelength conversion efficiency is suppressed in the first stage in which the fundamental wave has a high intensity, and a significant amount of heat is generated by absorbing light in in the wavelength conversion element. Therefore, it is possible to avoid the reduction in wavelength conversion efficiency due to heat generation even when a high-power fundamental wave is input in the first stage of the wavelength conversion element. Therefore, when adopting such wavelength conversion element that generally results is a reduction in wavelength conversion by absorbing light with an input of high-power fundamental wave, it is possible to prevent a reduction in wavelength conversion efficiency due to heat generation.

In the foregoing structure, it is preferable that the wavelength conversion element is a polarization inversion element, and the optical system is set such that an inclination angle of a fundamental wave with respect to a polarization inversion structure in the polarization inversion element in at least one of the second stage and stages subsequent to the second stages is closer to 90° than an inclination angle of a fundamental wave with respect to the polarization inversion structure in the first stage.

The wavelength conversion efficiency from the fundamental wave to the second harmonic wave increases as the inclination angle of the fundamental wave with respect to the polarization inversion structure in the polarization inversion element approaches 90°. Accordingly, with the foregoing structure, the inclination angle of the fundamental wave with respect to the polarization inversion structure in the first stage is not set any closer to 90° than that that in any latter stage, thereby suppressing the wavelength conversion efficiency in the first stage.

As a result, a decrease in wavelength conversion efficiency due to heat generated in the wavelength conversion element in a former stage can be avoided. Therefore, it is possible to realize a wavelength conversion device which permits an overall improvement in wavelength conversion efficiency.

With the foregoing structure, it is preferable that the wavelength conversion element is a polarization inversion element, in portions where the fundamental wave is transmitted in each stage, a polarization inversion period of the polarization inversion element is set within a predetermined period range, and a range of the polarization inversion period in at least one of the second stage and stages subsequent to the second stage is set narrower than a range of the polarization inversion period in the first stage.

According to the foregoing structure, the wavelength conversion efficiency in the first stage can be reduced by imparting a wide range (the period range in the first stage is widened) from the shortest period to the longest period from among a plurality of polarization inversion periods in the first stage. Further, the period range of the polarization inversion structure at at least one of the second stage and stages subsequent to the second stage is set narrower than the period range of the polarization inversion period of the first stage and the wavelength conversion efficiency in the first stage is suppressed.

As a result, it is possible to avoid a decrease in wavelength conversion efficiency caused by heat generated in the wavelength conversion element in a former stage, which in turn makes it possible to improve an overall light conversion efficiency of the wavelength conversion device.

With the foregoing structure, it is preferable that the wavelength conversion element is a polarization inversion element, and in portions where the fundamental wave is transmitted in each stage, a polarization inversion structure of the polarization inversion element includes a conversion region having a polarization inversion period that contributes to wavelength conversion at a predetermined temperature and a dummy region having a polarization inversion period that does not contribute to wavelength conversion at said predetermined temperature, and a ratio of the conversion region is set higher in at least one of the second stage and stages subsequent to the second stage, than a ratio of the conversion region in the first stage.

When a polarization inversion element is used as the wavelength conversion element, the wavelength conversion efficiency from the fundamental wave to the second harmonic wave increases with an increase in ratio of a conversion region having a polarization inversion period that contributes to wavelength conversion in the polarization inversion period of the polarization inversion element in a position where a fundamental wave in each stage is transmitted. Accordingly, with the foregoing structure, the ratio of the aforementioned conversion regions in at least one of the second stage and stages subsequent to the second stage is set higher than the ratio of the conversion region in the polarization inversion period in the first stage, thereby suppressing the wavelength conversion efficiency in the first stage.

As a result, a decrease in wavelength conversion efficiency caused by heat generated in the wavelength conversion element in a former stage can be avoided. Therefore, it is possible to provide a wavelength conversion device which permits an overall improvement in wavelength conversion efficiency.

With the foregoing structure, it is desirable that the wavelength conversion element is a polarization inversion element in which a polarization inversion period differs in a thickness direction orthogonal to a propagation direction of the fundamental wave, and the optical system is arranged such that the fundamental wave is transmitted in portions in the thickness direction in each stage such that a duty ration of the polarization conversion in at least one of the second stage and stages subsequent to the second stage is closer to 50% than a duty ratio of polarization inversion in the first stage.

The wavelength conversion efficiency from the fundamental wave to the second harmonic wave typically increases when the fundamental wave passes through a position in the thickness direction in which a duty ratio of polarization inversion in the polarization inversion structure closer to 50%. Accordingly, with the foregoing structure, the optical system is set such that in at least one of the second stage and stages subsequent to the second stage the fundamental wave passes through a position in the thickness direction such that a duty ratio of polarization inversion is closer to 50% than in the first stage, thereby suppressing the wavelength conversion efficiency in the first stage.

As a result, it is possible to avoid a decrease in wavelength conversion efficiency caused by heat generated in the wavelength conversion element in a former stage. Therefore, it is possible to provide a wavelength conversion device which permits an overall improvement in wavelength conversion efficiency.

With the foregoing structure, it is preferable that the wavelength conversion element is a polarization inversion element, a polarization inversion period in portions where the fundamental wave is transmitted in each stage is uniform in a propagation direction of the fundamental wave, which monotonously increases or monotonously decreases from a former stage to a latter stage.

According to the foregoing structure, it can be arranged such that when the polarization inversion period of a former stage is short, the polarization inversion period monotonously increases to a latter latter stage. On the other hand, when the polarization inversion period of a former stage is long, the polarization inversion period monotonously decreases to a latter stage, so that the wavelength conversion efficiency can be increased from a former stage to a latter stage. As a result, it is possible to avoid a decrease in wavelength conversion efficiency due to heat generated in the wavelength conversion element in a latter stage, which in turn makes it possible to provide a wavelength conversion device which permits an overall improvement in wavelength conversion efficiency.

Furthermore, by setting a wide range of length for the polarization inversion period from a short period to a long period, it is possible to convert the fundamental waves of different power levels by means of single wavelength conversion element. Therefore, the production cost can be reduced.

With the above-described structure, it is preferable that the wavelength selective mirror include a wavelength selective film that transmits a third harmonic wave.

According to the foregoing structure wherein the wavelength selective film is provided, it is also possible to suppress heat generated in the wavelength conversion element due to a third harmonic wave. As a result, it is possible to still reduce the overall heat generated in the wavelength conversion element. It is therefore possible to more effectively prevent a decrease in wavelength conversion efficiency caused by heat generated in the wavelength conversion element. As a result, it is possible to provide a wavelength conversion device which permits an overall improvement in wavelength conversion efficiency.

An image display apparatus in accordance with another aspect of the present invention includes: a liquid crystal display panel; and a backlight device that illuminates the liquid crystal display panel from the back, wherein the backlight device includes a plurality of laser light sources that emit red light, green light, and blue light, and the green laser light source, from among the laser light sources, includes the wavelength conversion device according to any one of the foregoing structures.

An image display apparatus in accordance with another aspect of the present invention includes: a screen, and a plurality of laser light sources that emit red light, green light, and blue light, wherein the green laser light source, from among the laser light sources, includes the wavelength conversion device according to any one of the foregoing structures.

According to the foregoing structures, it is possible to realize an image display apparatus which displays color images, capable of converting wavelength to a higher harmonics wave with overall high efficiency, while realizing compact size and low power consumption.

With the foregoing structures, it is preferable that the foregoing structures further include a fiber bundle or a rod integrator, to which a second harmonic wave output from the wavelength conversion device is entered.

According to the foregoing structure, it is possible to realize an image display apparatus that can display quality images without a problem of unevenness in brightness.

With the foregoing structure, it is preferable that an aspherical mirror be adopted as the wavelength selective mirror of the wavelength conversion device.

According to the foregoing structure, the wavelength selective mirror of the wavelength conversion device is constituted by an aspherical lens. Therefore, the beam can be collected to even smaller diameter at the incident end surface of the fiber bundle or rod integrator. As a result, the image display apparatus can be further reduced in size.

INDUSTRIAL APPLICABILITY

The present invention provides a compact and high-efficient wavelength conversion device that emits W-class green high-output laser beam and also provides a quality image display apparatus adopting such wavelength conversion device in a laser light source. The invention is useful for large display devices and high-brightness display devices, and the like.

The specific embodiments or examples described in the detailed description of the invention are merely for clarifying the technical content of the present invention, and the present invention should not be interpreted within these limited examples, but can be modified in various ways within the sprit of the present invention and scope of the claims described herein below.

The invention claimed is:

1. A wavelength conversion device, comprising:
a laser light source that emits a fundamental wave;
a wavelength conversion element that converts the fundamental wave into a second harmonic wave; and
an optical system including a wavelength selective mirror that reflects the fundamental wave transmitted through the wavelength conversion element without being converted, while transmitting therethrough the second harmonic wave generated by wavelength conversion,
wherein the optical system, which makes the fundamental wave enter the wavelength conversion element to be focused to have a focusing point in the wavelength conversion element, makes the fundamental wave, transmitted through the wavelength conversion element without being converted into the second harmonic wave, enter the wavelength conversion element again once or more than once to be subjected to wavelength conversion while being focused to have a focusing point in the wavelength conversion element by the wavelength selective mirror in such a manner that respective focusing points are scattered in the wavelength conversion element; and
the conversion efficiency in at least one of the second stage and stages subsequent to the second stage is higher than the conversion efficiency in the first stage, where the conversion efficiency in each stage is defined as: (a second harmonic wave generated in one stage)/(a square of the fundamental wave entered in said one stage).

2. The wavelength conversion device according to claim 1, wherein:
a conversion efficiency η from the fundamental wave entered the first stage at a predetermined intensity of light into a second harmonic wave satisfies the condition of:

$$\eta < (1.068 \times 2\omega^3 \times d_{eff}^2 \times L)/(\pi \times \epsilon_o \times c^4 \times n_w^2)$$

(where ω is an angular frequency of the fundamental wave, $d_{eff}$ is an effective nonlinear optical constant, L is a length of the wavelength conversion element, $\epsilon_o$ is a dielectric constant of vacuum, $n_w$ is a refractive index with respect to the fundamental wave, and c is a speed of light); and
the optical system is arranged such that a beam waist diameter of the fundamental wave that enters at least one of the second stage and stages subsequent to the second stage is smaller than a beam waist diameter of the fundamental wave that enters the first stage.

3. The wavelength conversion device according to claim 1, wherein:
the wavelength conversion element is a polarization inversion element, and
the optical system is set such that an inclination angle of a fundamental wave with respect to a polarization inversion structure in the polarization inversion element in at least one of the second stage and stages subsequent to the second stages is closer to 90° than an inclination angle of a fundamental wave with respect to the polarization inversion structure in the first stage.

4. The wavelength conversion device according to claim 1, wherein:
the wavelength conversion element is a polarization inversion element, and
in portions where the fundamental wave is transmitted in each stage, a polarization inversion period of the polarization inversion element is set within a predetermined period range, and a range of the polarization inversion period in at least one of the second stage and stages subsequent to the second stage is set narrower than a range of the polarization inversion period in the first stage.

5. The wavelength conversion device according to claim 1, wherein:
the wavelength conversion element is a polarization inversion element, and
in portions where the fundamental wave is transmitted in each stage, a polarization inversion structure of the polarization inversion element includes a conversion region having a polarization inversion period that contributes to wavelength conversion at a predetermined temperature and a dummy region having a polarization inversion period that does not contribute to wavelength conversion at said predetermined temperature, and a ratio of the conversion region is set higher in at least one of the second stage and stages subsequent to the second stage, than a ratio of the conversion region in the first stage.

6. The wavelength conversion device according to claim 1, wherein:
the wavelength conversion element is a polarization inversion element in which a polarization inversion period differs in a thickness direction orthogonal to a propagation direction of the fundamental wave, and
the optical system is arranged such that the fundamental wave is transmitted in portions in the thickness direction in each stage such that a duty ration of the polarization conversion in at least one of the second stage and stages subsequent to the second stage is closer to 50% than a duty ratio of polarization inversion in the first stage.

7. The wavelength conversion device according to claim 1, wherein:
the wavelength conversion element is a polarization inversion element,
a polarization inversion period in portions where the fundamental wave is transmitted in each stage is uniform in a propagation direction of the fundamental wave, which monotonously increases or monotonously decreases from a former stage to a latter stage.

8. The wavelength conversion device according to claim 1, wherein the wavelength selective mirror includes a wavelength selective film that transmits therethrough a third harmonic wave.

9. An image display apparatus, comprising:
a liquid crystal display panel; and
a backlight device that illuminates the liquid crystal display panel from a back, wherein
the backlight device includes a plurality of laser light sources that emit red light, green light, and blue light, and the green laser light source, from among the laser light sources, includes the wavelength conversion device according to claim 1.

10. The image display apparatus according to claim 9, further comprising:
a fiber bundle or a rod integrator, to which a second harmonic wave output from the wavelength conversion device is entered.

11. An image display apparatus comprising:
a screen, and
a plurality of laser light sources that emit red light, green light, and blue light,
wherein the green laser light source, from among the laser light sources, includes the wavelength conversion device according to claim 1.

12. The image display apparatus according to claim 10, wherein the wavelength selective mirror of the wavelength conversion device is an aspherical mirror.

* * * * *